United States Patent
Harada et al.

(10) Patent No.: US 8,338,029 B2
(45) Date of Patent: *Dec. 25, 2012

(54) NEGATIVE ELECTRODE ACTIVE MATERIAL FOR NONAQUEOUS ELECTROLYTE BATTERY, NONAQUEOUS ELECTROLYTE BATTERY, BATTERY PACK, AND VEHICLE

(75) Inventors: Yasuhiro Harada, Yokohama (JP); Norio Takami, Yokohama (JP); Hiroki Inagaki, Kawasaki (JP); Tomokazu Morita, Funabashi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/365,333

(22) Filed: Feb. 3, 2012

(65) Prior Publication Data

US 2012/0135294 A1    May 31, 2012

Related U.S. Application Data

(63) Continuation of application No. 11/853,546, filed on Sep. 11, 2007, now Pat. No. 8,137,843.

(30) Foreign Application Priority Data

Sep. 29, 2006   (JP) ................................ 2006-267984

(51) Int. Cl.
*H01M 4/485* (2010.01)
*C01G 23/04* (2006.01)

(52) U.S. Cl. .................. 429/231.1; 429/231.5; 423/598

(58) Field of Classification Search ............... 429/231.1, 429/231.5; 423/598
See application file for complete search history.

(56) References Cited

U.S. PATENT DOCUMENTS

| | | | |
|---|---|---|---|
| 6,372,384 B1 | 4/2002 | Fujimoto et al. | 429/231 |
| 6,395,425 B1 | 5/2002 | Kanno et al. | 429/231.5 |
| 7,595,134 B2 | 9/2009 | Inagaki et al. | 429/231.1 |
| 7,939,200 B2 * | 5/2011 | Ohzuku et al. | 429/231.5 X |
| 2006/0257746 A1 | 11/2006 | Inagaki et al. | 429/231.5 |
| 2007/0243467 A1 | 10/2007 | Zaghib et al. | 429/231 |
| 2008/0078594 A1 * | 4/2008 | Harada et al. | 252/182.1 X |
| 2008/0145758 A1 | 6/2008 | Kim et al. | 429/231.5 |

FOREIGN PATENT DOCUMENTS

| | | |
|---|---|---|
| JP | 5-98250 | 4/1993 |
| JP | 11-283624 | 10/1999 |
| JP | 2003-183030 | 7/2003 |
| JP | 2004-55541 | 2/2004 |
| JP | 2004-221523 | 8/2004 |

OTHER PUBLICATIONS

Michele Van Thournout et al., "Effect of the substitution Ti/(Fe,Ni) on the electrochemical properties of $Li_2Ti_3O_7$ as electrode materials for Li-ion accumulators", Journal of Physics and Chemistry of Solids, vol. 67, Issues 5-6, 2006, pp. 1355-1358.

* cited by examiner

*Primary Examiner* — Stephen J. Kalafut
(74) *Attorney, Agent, or Firm* — Oblon, Spivak, McClelland, Maier & Neustadt, L.L.P.

(57) ABSTRACT

A negative electrode active material contains a metal-displaced lithium-titanium oxide of a ramsdellite structure expressed by the formula $Li_{(16/7)-x}Ti_{(24/7)-y}M_yO_8$ (where M is at least one metal element selected from the group consisting of Nb, Ta, Mo, and W, and x and y are respectively numbers in the range of $0 \le x < 16/7$ and $0 < y < 24/7$).

9 Claims, 11 Drawing Sheets

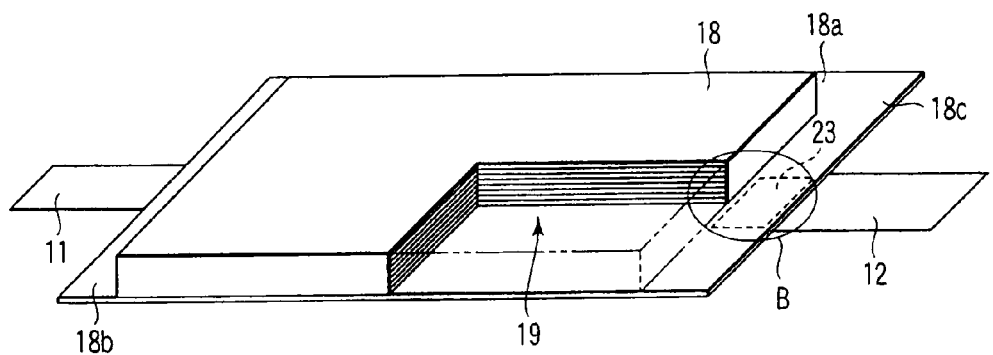
F I G. 4
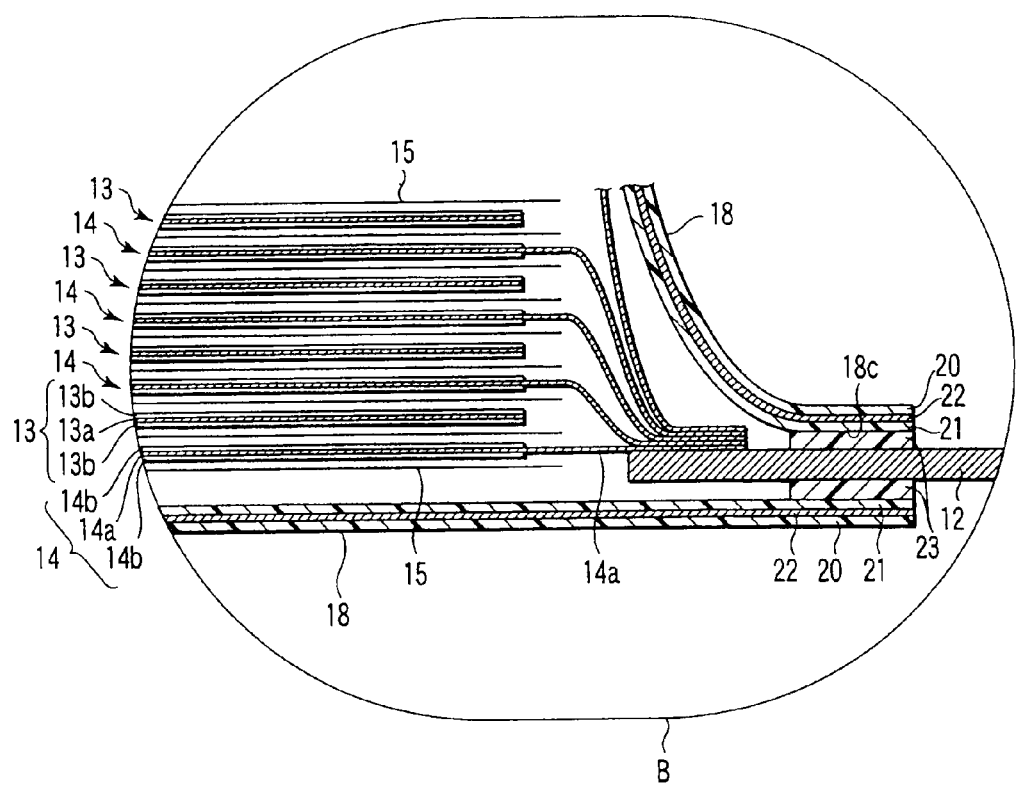
F I G. 5

NEGATIVE ELECTRODE ACTIVE MATERIAL FOR NONAQUEOUS ELECTROLYTE BATTERY, NONAQUEOUS ELECTROLYTE BATTERY, BATTERY PACK, AND VEHICLE

CROSS-REFERENCE TO RELATED APPLICATIONS

This application is a continuation application of U.S. Ser. No. 11/853,546, filed Sep. 11, 2007, now U.S. Pat. No. 8,137,843; and claims the benefit of priority from prior Japanese Patent Application No. 2006-267984, filed Sep. 29, 2006, the entire contents of which are incorporated herein by reference.

BACKGROUND OF THE INVENTION

1. Field of the Invention

The present invention relates to a negative electrode active material for a nonaqueous electrolyte battery, a nonaqueous electrolyte battery having such negative electrode active material, a battery pack, and a vehicle.

2. Description of the Related Art

Conventionally, titanium oxide compounds are widely used as a negative electrode material for nonaqueous electrolyte lithium secondary batteries that can be used repeatedly by charging and discharging. However, although the conventional titanium oxide compound is excellent in repeated charging and discharging characteristics, it is higher in potential to metal lithium than graphite or other carbonaceous materials, and is hence lower in capacity density per unit weight. Therefore, it is low in energy density that is one of the important properties as secondary battery. For example, conventional titanium oxide (anatase) is about 165 mAh/g in its theoretical capacity, and a lithium-titanium composite oxide system is also about 180 mAh/g in its theoretical capacity, both being much inferior to the theoretical capacity of graphite material (more than 385 mAh/g). Most of titanium oxide compounds have few equivalent sites for inserting lithium in a crystal structure, and lithium is likely to be stabilized in its structure. As a result, the effective capacity becomes low. Diffusion coefficient of lithium ion in titanium oxide is low, and thus for fast charging and discharging, the negative electrode active material is desired to have a higher lithium diffusion capability.

JP-A 2003-183030 (KOKAI) discloses a negative electrode active material for a lithium secondary battery, more specifically lithium-nickel-titanium oxide having a ramsdellite type crystal structure represented by the formula: $Li_{2-2x/3}Ni_xTi_{3-x/3}O_7$ (0<x≦0.5). This lithium-nickel-titanium oxide is combined with divalent Ni having a smaller valency than tetravalent Ti, and thus in spite of the ramsdellite type crystal structure, the correlation of Li—O is reinforced by the effect of Ni getting into Ti site. Therefore, a three-dimensional space suited to intercalation and deintercalation of lithium ion cannot be presented, and the diffusion performance of lithium ion is small. Hence, this lithium-nickel-titanium oxide cannot improve the fast charging and discharging performance, in particular, among battery properties.

On the other hand, the electrode potential of titanium oxide compound is about 1.5V on the basis of metal lithium. This electrode potential is determined by oxidation-reduction reaction between $Ti^{3+}$ and $Ti^{4+}$ when intercalating and deintercalating lithium electrochemically, and cannot be varied. Therefore, to achieve the fast charging and discharging performance of a secondary battery, it is important to increase the negative electrode capacity, in addition to enhancement of diffusion performance of lithium ion mentioned above.

JP-A 2004-221523 (KOKAI) relates to an electrochemical capacitor, in which the negative electrode is composed of lithium-titanium oxide having a ramsdellite type crystal structure, for example, $Li_2Ti_3O_7$. This $Li_2Ti_3O_7$ is excellent in cycle characteristics, low in risk of overcharging among known negative electrode materials, and is known to have excellent diffusion performance of lithium ion as compared with spinel type compound such as $Li_4Ti_5O_{12}$. However, this compound is low in effective capacity (not more than 130 mAh/g) as compared with theoretical capacity (about 230 mAh/g), and is not sufficiently applicable to fast charging and discharging.

BRIEF SUMMARY OF THE INVENTION

According to an aspect of the present invention, there is provided a negative electrode active material for a nonaqueous electrolyte battery, comprising a metal-displaced lithium-titanium oxide of a ramsdellite structure expressed by the formula (1):

$$Li_{(16/7)-x}Ti_{(24/7)-y}M_yO_8 \quad (1)$$

where M is at least one metal element selected from the group consisting of Nb, Ta, Mo, and W, and x and y are respectively numbers in the range of 0<x<16/7 and 0<y<24/7.

BRIEF DESCRIPTION OF THE SEVERAL VIEWS OF THE DRAWING

FIG. 4 is a partially cut-away perspective view of a nonaqueous electrolyte battery having a laminate type battery group;

FIG. 5 is a magnified sectional view showing essential parts of the laminate type battery group;

DETAILED DESCRIPTION OF THE INVENTION

Preferred embodiments of the present invention will be specifically described below with reference to the accompanying drawings.

<Negative Electrode Active Material for Nonaqueous Electrolyte Battery>

A negative electrode active material for a nonaqueous electrolyte battery of the invention contains a metal-displaced lithium-titanium oxide having a ramsdellite structure expressed by the formula (1):

$$Li_{(16/7)-x}Ti_{(24/7)-y}M_yO_8 \quad (1)$$

where M is at least one metal element selected from the group consisting of Nb, Ta, Mo, and W, and x and y are respectively numbers in the range of $0<x<16/7$ and $0<y<24/7$.

Figure 1:
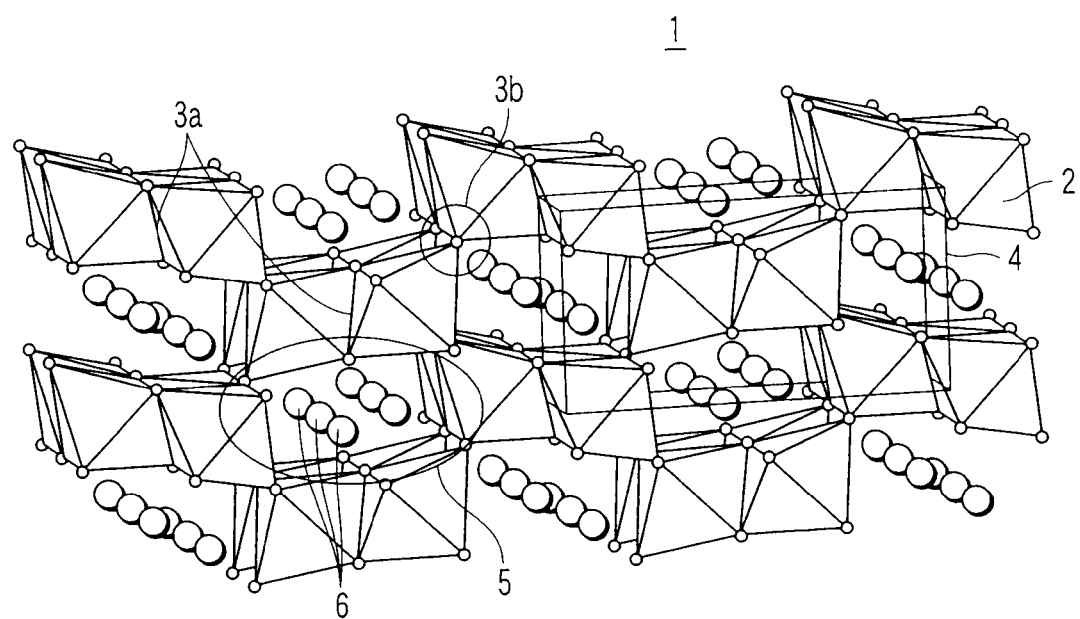
FIG. 1 is a structural diagram of ramsdellite type crystal.

Generally, a lithium-titanium oxide 1 having a ramsdellite type crystal structure is formed as shown in FIG. 1, in which titanium ions coordinate six oxygen atoms to form octahedral structures 2 of $TiO_6$, adjacent $TiO_6$ type octahedral structures 2 share an edge 3a to form double chain bonds mutually, and apexes 3b of the octahedral structures 2 are coupled to one another to form a three-dimensional skeleton. In this skeleton shown in FIG. 1, a (2×1) tunnel is formed as indicated by reference numeral 5. The tunnel 5 functions as a space for intercalating and deintercalating Li ions 6 in the crystal, and mainly the Li ions 6 existing in the tunnel 5 are considered to contribute to charging and discharging of a battery. Reference numeral 4 is a unit lattice. A crystallite is formed of a set of multiple unit lattices 4. Multiple crystallites aggregate to form a particle, and primary particles and secondary particles are formed.

The oxide having the ramsdellite structure shown in the formula (1) increases hole sites in the tunnel 5 by displacing part of Ti ions in this structure with cation M of larger valency than Ti ion (that is, pentavalent element $M^V$ (Nb and/or Ta), and/or hexavalent element $M^{VI}$ (Mo and/or W)). As a result of increase of the hole sites, capacity and diffusion performance of Li ions are enhanced. That is, a correlation of Li and O is known to be one of the important factors for dominating the diffusion of Li ions in titanium oxide compound, and by introducing the M-O bond showing a stronger bonding strength than the Ti—O bonding strength into the three-dimensional skeleton, the Li—O correlation is weakened, and the diffusion performance of Li ions is improved. Besides, by introduction of the metal element M, hole sites capable of intercalating and deintercalating the Li ions are increased. As a result, the amount of Li that can be intercalated and deintercalated electrochemically is increased, and thus the capacity increases, thereby improving the Li ion diffusion performance in the crystal structure.

The oxide expressed by the formula (1) is represented by a chemical formula in the light of its crystal structure as shown in the following formula (2):

$$(Li_{(12/7)-x}\square_{16/7})[(Li_{4/7}(Ti_{(24/7)-y}M_yO_8)] \quad (2)$$

where the square mark indicates the hole site in the tunnel structure, and the portion enclosed by brackets [ ] represents the component element in the three-dimensional skeleton.

The metal-displaced lithium-titanium oxide of the ramsdellite structure expressed by the formula (1) has an orthorhombic system or an analogous crystal system slightly distorted from orthorhombic system, and its representative space group is Pnma showing an ideal symmetricity. An analogous space group slightly distorted from this representative space group Pnma includes Pbnm, Pmcn, Pnmb, or Pnam. These analogous space groups slightly distorted from the space group Pnma include both component elements holding an ideal symmetricity, and others slightly deviated from the symmetrical positions.

In the formula (1), x and y are desirably in the range of $0<x\leq2.0$, and $0<y\leq2.0$, respectively, so that the metal-displaced lithium-titanium oxide may be electrically neutral. If x or y exceeds 2, Li ions are almost lost in the crystal structure, and the Li ion conductivity is lowered as well as a different phase (impurity phase) may appear in the crystal structure. To provide Li/hole ratio capable of assuring more favorable Li ion conductivity in the metal-displaced lithium-titanium oxide solid matter in a discharged state, x and y are more desirably in the range of $0<x\leq0.5$, and $0<y\leq0.5$, respectively. In particular, when the metal element M is a hexavalent element (Mo, W), x and y are more preferably in the range of $0<x\leq0.5$, and $0<y\leq0.25$, respectively.

The metal-displaced lithium-titanium oxide of the ramsdellite structure expressed by the formula (1) can be synthesized by a solid phase reaction method. In the solid phase reaction method, Ti source, Li source and M source are used as starting materials.

While the Ti source includes $TiO_2$ and titanium compound producing $TiO_2$ by heating (for example, carbonate or nitrate), titanium dioxide ($TiO_2$) is preferred, and rutile or anatase may be used either alone or in combination. The Li source includes $LiO_2$ and lithium compound producing $LiO_2$ by heating (for example, carbonate or nitrate). The M metal source includes $M^V_2O_5$ and $M^V$ compound producing $M^V_2O_5$ by heating (for example, carbonate or nitrate of $M^V$), and/or $M^{VI}O_3$ and $M^{VI}$ compound producing $M^{VI}O_3$ by heating (for example, carbonate or nitrate of $M^{VI}$).

These starting materials are mixed by a ratio corresponding to the composition ratio of Ti, Li and M in the formula (1), but in consideration of portion of loss (evaporation) of lithium during baking, a loss is predicted in advance, and the corresponding amount of lithium is increased accordingly. The adjusted materials are mixed by a ball mill. In mixing process by the ball mill, for example, the rate of volume of balls (for example, zirconia balls) to volume of a container (ball volume occupancy) is adjusted to 20%, and balls of about 10 to 15 mm in diameter are rotated for 1 hour at a rotating speed of 600 rpm. In this case, if the mixing time is too short (less than 30 minutes), the precursor is not mixed sufficiently, and homogeneous mixed phase is hardly obtained. If the mixing time is too long (more than 2 hours), the mechanochemical reaction is progressed too much, and a phase separation may occur to transform the target compound into a different compound. In long-time processing, further, ball components may be mixed with the precursor.

The mixed material mixture is calcined, and a precursor of the oxide shown by the formula (1) is obtained. The temperature of calcining is preferably 600 to 800° C. If the calcining temperature is less than 600° C., sufficient mixed state is hardly obtained. If exceeding 800° C., baking is promoted, and uniform mixing is hardly obtained. The calcining time is preferably 5 to 20 hours.

The obtained precursor is crushed. The precursor can be crushed by a ball mill. In the crushing process by the ball mill, for example, the rate of volume of balls (for example, zirconia balls) to volume of a container (ball volume occupancy) is adjusted to 20%, and balls of about 10 to 15 mm in diameter are rotated for 1 hour at a rotating speed of 600 rpm. In this case, if the crushing time is too short (less than 30 minutes), the precursor is not crushed sufficiently, and homogeneous mixed phase is hardly obtained. If the crushing time is too long (more than 2 hours), the mechanochemical reaction is progressed too much, and a phase separation may occur to transform the target compound into a different compound. In long-time processing, further, ball components may be mixed with the precursor.

The crushed and mixed precursor is baked. The baking process is executed in atmosphere or in a stream of oxygen gas or nitrogen gas, at temperature of 800 to 1400° C. In this case, in order to obtain a desired ramsdellite structure, it is desired to repeat the operation of crushing the baked material again, and baking again in the same condition, by plural times. The crushing method is not particularly limited. By compacting the powder by a pressing die or the like and then baking, the reactivity can be further enhanced.

If the baking temperature is lower than 800° C., the reactivity is poor, it takes a longer time in baking, and it is hard to obtain a desired phase. If higher than 1400° C., the evaporation loss amount of lithium and constituent alkali metal increases, and it is likely to depart from the target composition. The total of baking time is approximately 12 to 72 hours depending on the baking temperature, and is preferably about 48 hours at 900 to 1200° C. The baking atmosphere is preferably air from the viewpoint of cost and convenience. However, in the case of composition hard to compose the ramsdellite structure, a desired crystal structure may be obtained by baking in a nitrogen atmosphere or pure oxygen atmosphere, or by baking at a high pressure.

After completion of baking, it is quenched in order to maintain the high temperature phase of the ramsdellite structure. Quenching speed may be 10° C./sec or more. The quenching medium is atmosphere or liquid nitrogen. From the viewpoint of maintaining the quenching speed, it is preferred to use a medium of high cooling capability such as liquid nitrogen.

The metal-displaced lithium-titanium oxide of the ramsdellite structure expressed by the formula (1) can be synthesized also by a sol-gel method. In the sol-gel method, titanium alkoxide (for example, titanium isopropoxide) is used as titanium source, and water-soluble salt (for example, nitrate) is used as lithium source and metal M source. Specifically, titanium alkoxide is dissolved in ethanol, and an aqueous solution of water-soluble salt of lithium and water-soluble salt of M metal is added while stirring sufficiently by the amounts so that the elements may form the composition as shown in the formula (1), and thereby a gel mixture is obtained. The obtained gel mixture is heated at about 90 to 120° C., and dried. The obtained powder is baked at 450 to 1400° C., and a desired metal-displaced lithium-titanium oxide having the ramsdellite structure is obtained. At this time, if the baking temperature is lower than 450° C., not only is the reactivity poor, but also organic components contained in the materials are not decomposed but are left over in the structure. If the baking temperature is higher than 1400° C., part of components may be lost by evaporation, and it is likely to depart from the target composition.

The obtained metal-displaced lithium-titanium oxide expressed by the formula (1) is preferably used in a nonaqueous electrolyte battery, especially as a negative electrode active material of a nonaqueous electrolyte lithium secondary battery. This oxide causes oxidation-reduction reaction between $Ti^{3+}$ and $Ti^{4+}$ when intercalating and deintercalating lithium, and a potential plateau of about 1.2 to 1.6V occurs in metal lithium electrochemically. Further, by the oxidation-reduction potential of displaced elements of higher valency, a second stage of potential plateau occurs. By intercalating and deintercalating lithium ions, the material can be used as a negative electrode active material of a lithium battery. As the negative electrode active material, the metal-displaced lithium-titanium oxide expressed by the formula (1) may be used alone, or this oxide may be combined with other known negative electrode active material, for example, spinel type lithium titanate (e.g. $Li_{4+x}Ti_5O_{12}$ (x being $-1 \leq x \leq 3$), or titanium oxide (e.g. $TiO_2$ or metal composite oxide containing at least one element selected from the group consisting of Ti, P, V, Sn, Cu, Ni and Fe, $TiO_2$—$P_2O_5$, $TiO_2$—$V_2O_5$, $TiO_2$—$P_2O_5$—$SnO_2$). When used in combination with other known negative electrode active material, the metal-displaced lithium-titanium oxide expressed by the formula (1) is preferred to occupy 50 wt % or more of the total negative electrode active material.

The average particle size of the negative electrode active material is desirably 1 μm or less. By using the negative electrode active material having average particle size of 1 μm or less, the cycle performance of a nonaqueous electrolyte secondary battery can be enhanced. Especially, this effect is outstanding at the time of charging at high speed or discharging at high output. However, if the average particle size is too small, distribution of nonaqueous electrolyte may be biased to the negative electrode side, and the electrolyte may be depleted in the positive electrode. Therefore, the lower limit of the particle size is desired to be 0.001 μm. The negative electrode active material having such average particle size is obtained by crushing the negative electrode active material by a ball mill until the average particle size becomes 1 μm or less. In crushing process by the ball mill, for example, the ratio of volume of balls (for example, zirconia balls) to volume of a container (ball volume occupancy) is adjusted to 20%, large balls of about 10 to 15 mm in diameter and small balls of about 5 mm in diameter are used, and the ball mill is rotated at a rotating speed of 600 rpm. In this case, crushing is not executed continuously, but is preferably executed intermittently at specific intervals. This is intended to avoid degeneration of active material caused by friction heat by mixing.

The average particle size of the negative electrode active material is measured by using a laser diffraction type distribution measuring instrument (SALD-300 of Shimadzu Corporation). First, about 0.1 g of active material sample, surface active agent, and 1 to 2 mL of distilled water are added in a beaker, and stirred and mixed sufficiently. This mixed solution is then poured into an agitating water tank, and while being agitated, the luminous intensity distribution is measured a total of 64 times at intervals of 2 seconds to numerically analyze the particle size distribution, thereby determining the average particle size of the negative electrode active material.

<Negative Electrode>

The negative electrode of the invention includes a conductive base material (negative electrode current collector) and a negative electrode active layer formed on the surface of the conductive bas material (one or both of two principal planes). The negative electrode active layer is a layer responsible for negative electrode reaction, that is, a layer active as negative electrode, and contains the negative electrode active material of the invention.

The negative electrode active layer contains a conductive agent in addition to the negative electrode active material of the invention, and usually contains a binder for binding them. Examples of the conductive agent include acetylene black, ketjen black, graphite, and other metal powder. Examples of the binder include polytetrafluoroethylene (PTFE), polyvinylidene fluoride (PVdF), fluororubber, and styrene butadiene rubber.

The blending ratio of the negative electrode active material, conductive agent, and binder is preferably in the range of 80 to 98 mass % of negative electrode active material, 0 to 20 mass % of conductive agent, and 2 to 7 mass % of binder.

The negative electrode current collector is desired to be formed of a conductive material, such as aluminum foil or aluminum alloy foil. The negative electrode current collector is desired to be 50 μm or less in average crystal particle size. As a result, the strength of the current collector is increased remarkably, and the negative electrode can be compacted to high density at high pressure, thereby increasing the battery capacity. It is also effective to prevent dissolution, corrosion or deterioration of the negative electrode current collector in overdischarging cycles in a high temperature environment (over 40° C.), and thus elevation of negative electrode impedance can be suppressed. Further, output characteristics, fast charge, and charging and discharging cycle characteristics can be improved. A more desirable range of the average crystal particle size is 30 μm or less, further preferably 5 μm or less.

The average crystal particle size of the negative electrode current collector can be determined as follows. The texture of the negative electrode current collector surface is observed by an optical microscope, and the number n of crystal grains existing in an area of 1 mm×1 mm is counted. By using the value of n, an average crystal particle area S is determined by the formula S=1×10$^6$/n (μm$^2$). From the obtained value of S, an average crystal particle size d (μm) is calculated by the formula (A):

$$d=2(S/\pi)^{1/2} \quad (A)$$

The average crystal particle size of aluminum foil and aluminum alloy foil varies due to effects of various factors, such as material texture, impurities, processing condition, history of heat treatment, and annealing condition. The crystal particle size can be adjusted by combining these factors in the manufacturing process of the current collector.

The thickness of aluminum foil and aluminum alloy foil is usually 20 μm or less, preferably 15 μm or less. The purity of aluminum foil is desired to be 99 mass % or more. An aluminum alloy is an alloy preferably containing magnesium, zinc or silicon. The content of transition metal such as iron, copper, nickel or chromium is desired to be 1 mass % or less.

The negative electrode can be manufactured by adding a binder and, if necessary, conductive agent to the negative electrode active material of the invention, suspending them in a proper solvent, and applying the suspension to the negative electrode current collector (conductive base material), followed by drying and pressing.

<Nonaqueous Electrolyte Battery>

The nonaqueous electrolyte battery of the invention includes a negative electrode, a positive electrode, and a nonaqueous electrolyte provided between the negative electrode and the positive electrode, and the negative electrode is configured as explained above.

The positive electrode includes a conductive base material (positive electrode current collector) and a positive electrode active layer formed on one or both sides of the current collector. The positive electrode current collector includes a positive electrode active material, and a conductive agent as required, and a binder for binding them.

Examples of the positive electrode active material include various metal oxides and sulfides. The examples include manganese dioxide ($MnO_2$), iron oxide, copper oxide, nickel oxide, lithium-manganese composite oxide (e.g. $Li_xMn_2O_4$ or $Li_xMnO_2$), lithium-nickel composite oxide (e.g. $Li_xNiO_2$), lithium-cobalt composite oxide ($Li_xCoO_2$), lithium-nickel-cobalt composite oxide {e.g. $LiNi_{1-y-z}Co_yM_zO_2$ (M being at least one element selected from the group consisting of Al, Cr and Fe), $0 \leq y \leq 0.5$, $0 \leq z \leq 0.1$}, lithium-manganese-cobalt composite oxide {e.g. $LiMn_{1-y-z}Co_yM_zO_2$ (M being at least one element selected from the group consisting of Al, Cr and Fe), $0 \leq y \leq 0.5$, $0 \leq z \leq 0.1$}, lithium-manganese-nickel composite oxide {e.g. $LiMn_xNi_xM_{1-2x}O_2$ (M being at least one element selected from the group consisting of Co, Cr, Al, and Fe), $1/3 \leq x \leq 1/2$, e.g. $LiMn_{1/3}Ni_{1/3}Co_{1/3}O_2$, $LiMn_{1/2}Ni_{1/2}O_2$}, spinel type lithium-manganese-nickel composite oxide ($LixMn_{2-y}Ni_yO_4$), lithium-phosphorus oxide having an olivine structure ($Li_xFePO_4$, $Li_xFe_{1-y}Mn_yPO_4$, $Li_xCoPO_4$, etc.), iron sulfate {$Fe_2(SO_4)_3$}, and vanadium oxide (e.g. $V_2O_5$). Other examples include conductive polymer materials such as polyaniline and polypyrrole, disulfide polymer, sulfur (S), carbon fluoride, other organic materials and inorganic materials. The values of x, y and z are desired to be in the range of 0 or more to 1 or less.

More preferred examples of the positive electrode active material for a secondary battery include lithium-manganese composite oxide, lithium-nickel composite oxide, lithium-cobalt composite oxide, lithium-nickel-cobalt composite oxide, lithium-manganese-nickel composite oxide, spinel type lithium-manganese-nickel composite oxide, lithium-manganese-cobalt composite oxide, and lithium ion phosphate. By using these positive electrode active materials, a high battery voltage is obtained.

The conductive agent and binder may be the same as those used in the negative electrode.

The blending ratio of the positive electrode active material, conductive agent, and binder is preferably in the range of 80 to 95 mass % of positive electrode active material, 3 to 20 mass % of conductive agent, and 2 to 7 mass % of binder.

The positive electrode current collector can be formed by using the same conductive material as used in the negative electrode current collector.

The positive electrode is manufactured in the same procedure as in manufacture of the negative electrode.

The nonaqueous electrolyte provided between the negative electrode and the positive electrode contains nonaqueous solvent, and electrolytic salt dissolved in this nonaqueous solvent. The nonaqueous solvent may contain polymer.

Examples of the nonaqueous solvent are not particularly limited, but may include, among others, propylene carbonate (PC), ethylene carbonate (EC), 1,2-dimethoxy ethane (DME), γ-butyrolactone (GBL), tetrahydrofuran (THF), 2-methyl tetrahydrofuran (2-MeHF), 1,3-dioxolane, sulfolane, acetonitrile (AN), diethyl carbonate (DEC), dimethyl carbonate (DMC), methyl ethyl carbonate (MEC), and dipropyl carbonate (DPC). These solvents may be used either alone or in combination of two or more types. In particular, β-butyrolactone is preferred. When two or more solvents are combined, it is preferred to select solvents having dielectric constant of 20 or more.

Examples of the electrolytic salt include lithium salts such as $LiPF_6$, $LiBF_4$, $Li(CF_3SO_2)_2N$ (bistrifluoromethane sulfonylamide lithium; known as LiTFSI), $LiCF_3SO_3$ (known as LiTFS), $Li(C_2F_4SO_2)_2N$ (bispentane fluoroethane sulfonylamide lithium; known as LiBETI), $LiClO_4$, $LiAsF_6$, $LiSbF_6$, bisoxolate lithium phosphate ($LiB(C_2O_4)_2$ (known as LiBOB)), and difluoro (trifluoro-2-oxide-2-trifluoro-methyl propionate (2-)-0,0) lithium phosphate ($LiBF_2$ (OCOOC$(CF_3)_2$ (known as $LiBF_2$ (HHIB))). These electrolytic salts may be used either alone or in combination of two or more types. In particular, $LiPG_6$ and $LiBF_4$ are desirable.

The concentration of electrolytic salt is desirably in the range of 1.5M or more to 3M or less.

Additives may be added to the nonaqueous electrolyte. Examples of the additives are not particularly limited, and may include vinylene carbonate (VC), vinylene acetate (VA), vinylene butylate, vinylene hexanate, vinylene crotonate, and catechol carbonate. The concentration of the additive is preferably 0.1 mass % or more to 3 mass % or less with respect to 100 mass % of nonaqueous electrolyte. A more desirable range is 0.5 wt % or more to 1 wt % or less.

Between the negative electrode and the positive electrode, a separator is usually disposed for preventing contact between the negative electrode and the positive electrode, and for keeping a space for holding the nonaqueous electrolyte.

The material of the separator includes polyethylene, polypropylene, cellulose, polyvinylidene fluoride (PVdF), other porous film, and synthetic resin unwoven cloth. In particular, a porous film made of polyethylene or polypropylene is dissolved by abnormal exothermic reaction to close pores, thereby shutting off conduction between the negative electrode and the positive electrode, and is hence preferred from the viewpoint of enhancement of safety.

Such nonaqueous electrolyte lithium secondary battery is excellent in repeated charging and discharging performance, high in capacity density, and is also excellent in rapid charging and discharging performance.

(First Embodiment)

Referring now to FIGS. 2 to 6, a nonaqueous electrolyte battery according to a first embodiment of the invention will be described below.

Figure 2:
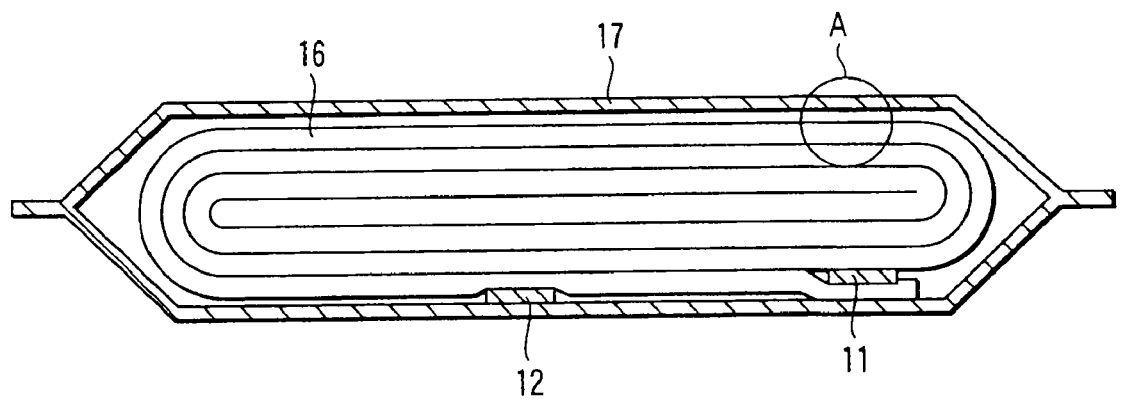
FIG. 2 is an internal perspective sectional view schematically showing a nonaqueous electrolyte battery having a coiled type battery group.

As shown in FIG. 2, a flat spirally wound coiled type electrode group 16 is housed in an armoring member 17. The coiled type electrode group 16 includes a positive electrode 13, a negative electrode 14, and a separator 15 interposed therebetween (FIG. 3), being spirally wound in a flat shape. The nonaqueous electrolyte is held in the coiled electrode group 16.

Figure 3:
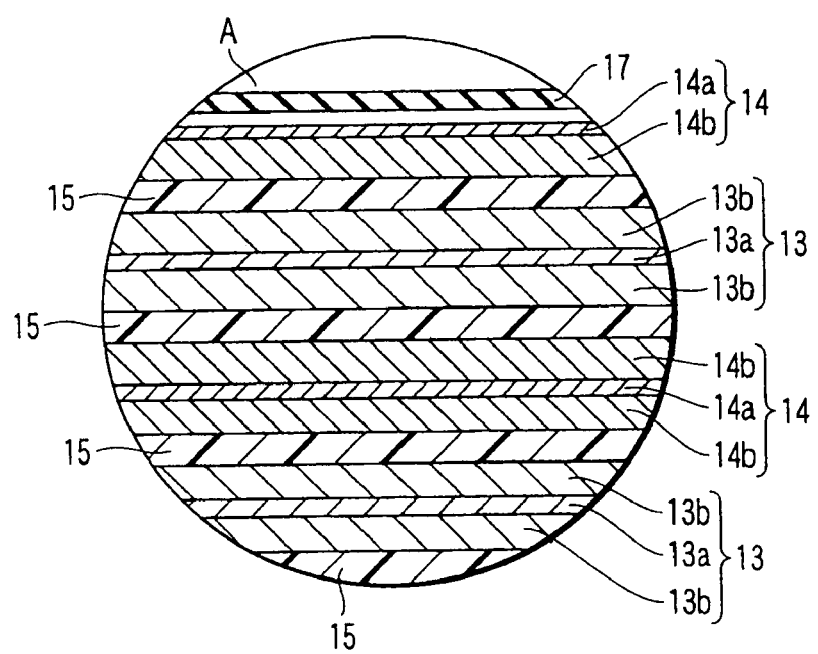
FIG. 3 is a partially magnified sectional view of the coiled type battery group.

As shown in FIG. 3, the negative electrode 14 is positioned on the outermost circumference of the coiled electrode group 16. At the inner circumferential side of the negative electrode 14, the separator 15, positive electrode 13, separator 15, negative electrode 14, separator 15, positive electrode 13, and separator 15 are disposed in this order. The negative electrode 14 includes a negative electrode current collector 14a, and a negative electrode active material containing layer 14b carried on the negative electrode current collector 14a. In the portion positioned on the outermost circumference of the negative electrode 14, the negative electrode active material containing layer 14b is formed only on one side of the negative electrode current collector 14a. The positive electrode 13 includes a positive electrode current collector 13a, and a positive electrode active material containing layer 13b carried on the positive electrode current collector 13a.

As shown in FIG. 2, a positive electrode terminal 11 is electrically connected to the positive electrode current collector 13a near the outer circumferential end of the coiled electrode group 16. On the other hand, a negative electrode terminal 12 is electrically connected to the negative electrode current collector 14a near the outer circumferential end of the coiled electrode group 16. The shape of the positive electrode terminal 11 and the negative electrode terminal 12 is like a band. The leading ends of these terminals 11, 12 are drawn to the outside from the same side of the armoring member 17.

In this embodiment, the electrode group is in a coiled structure, but the electrode group may be also formed in a laminate structure as shown in FIGS. 4 and 5. A laminate type electrode group 19 is surrounded by an armoring member 18 made of a laminate film. The laminate film 18 includes, as shown in FIG. 4, a resin layer 20, a thermofusible resin layer 21, and a metal layer 22 interposed between the resin layer 20 and the thermofusible resin layer 21. At the inner side of the armoring member 18, the thermofusible resin layer 21 is positioned. At one longer side and both shorter sides of the armoring member 18, heat seals 18a, 18b, 18c are formed by thermal fusion of the thermofusible resin layer 21. The armoring member 18 is sealed by these heat seals 18a, 18b, 18c.

The laminate type electrode group 19 includes a plurality of positive electrodes 13, a plurality of negative electrode 14, and separators 15 interposed between the positive electrodes 13 and the negative electrodes 14. The laminate type electrode group 19 has a structure as shown in FIG. 5, in which the positive electrodes 13 and the negative electrodes 14 are laminated alternately together while interposing the separators 15 therebetween. Each of the positive electrodes 13 includes a positive electrode current collector 13a, and a positive electrode active material containing layer 13b carried on both sides of the positive electrode current collector 13a. Each of the negative electrodes 14 includes a negative electrode current collector 14a, and a negative electrode active material containing layer 14b carried on both sides of the negative electrode current collector 14a. The negative electrode current collector 14a of the negative electrode 14 has one short side projected from the positive electrode 13. The negative electrode current collector 14a projecting from the positive electrode 13 is electrically connected to the band-like negative electrode terminal 12. The leading end of the negative electrode terminal 12 is drawn to the outside through the heat seal 18c of the armoring member 18. The heat seals 18c at both sides of the negative electrode terminal 12 are opposite to a pair of thermofusible resin layers 21 respectively by way of an insulating film 23. To enhance the bonding strength of the heat seal 18c and the negative electrode terminal 12, the insulating film 23 is interposed between each side of the negative electrode terminal 12 and the thermofusible resin layer 21. The insulating film 23 is, for example, a film formed by adding an acid anhydride to polyolefin containing at least one of polypropylene and polyethylene.

Although not shown in the drawing, the positive electrode current collector 13a of the positive electrode 13 has its one short side projecting from the negative electrode 14. The projecting direction of the positive electrode current collector 13a is opposite to the projecting direction of the negative electrode current collector 14a. The positive electrode current collector 13a projecting from the negative electrode 14 is connected electrically to the band-like positive electrode terminal 11. The leading end of the positive electrode terminal 11 is drawn to the outside through the heat seal 18b of the armoring member 18. To enhance the bonding strength of the heat seal 18b and the positive electrode terminal 11, the insulating film 23 is interposed between the positive electrode terminal 11 and the thermofusible resin layer 21. The withdrawing direction of the positive terminal 11 from the armoring member 18 is opposite to the withdrawing direction of the negative terminal 12 from the armoring member 18.

Figure 6:
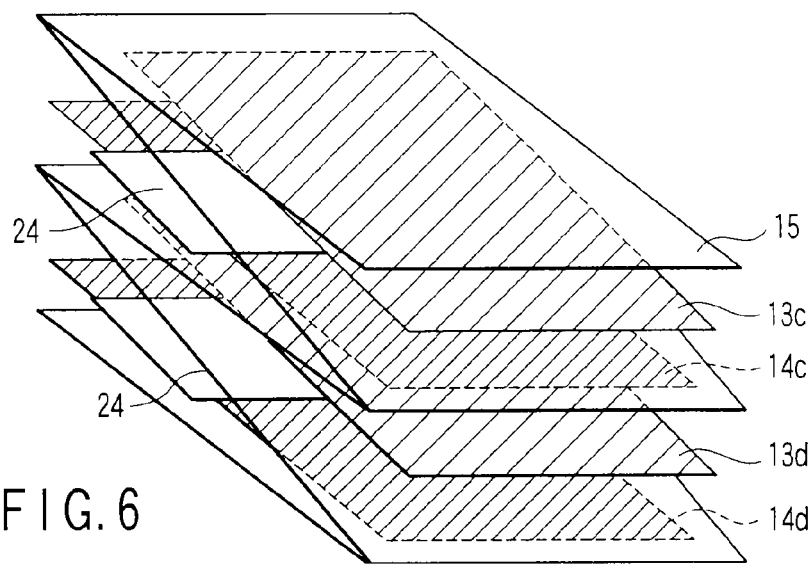
FIG. 6 is a perspective exploded view of the laminate type battery group.

To realize a high large-current performance during operation for a long time, the electrode group including positive electrodes and negative electrodes is preferred to be in a laminate structure, with the separator folded in a zigzag pattern as shown in FIG. 6. The band-like separator 15 is folded in a zigzag pattern. Between the zigzag-folded separators 15, strips of positive electrode 13c, negative electrode 14c, positive electrode 13d, and negative electrode 14d are sequentially inserted from above. From the shorter sides of the positive electrodes 13c, 13d, positive electrode terminals 24 are drawn out. By disposing the positive electrodes 13 and the negative electrodes 14 alternately between the zigzag-folded separators 15, an electrode group of a laminate structure is obtained.

The armoring member, the negative electrode terminal and the positive electrode terminal will be specifically described below.

The armoring member is, for example, a laminate film having thickness of 0.2 mm or less, or a metal container having a wall thickness of 0.5 mm or less.

The wall thickness of a metal container is more preferably 0.2 mm or less.

The laminate film is a multilayer film consisting of a metal layer and a resin layer for covering the metal layer. For reduction of weight, the metal layer is preferably an aluminum foil or an aluminum alloy foil. The resin layer is to reinforce the metal layer, and is made of high polymer such as polypropylene (PP), polyethylene (PE), nylon, or polyethylene terephthalate (PET). The laminate film is formed by sealing by thermal fusion.

The metal container is made of, for example, aluminum or aluminum alloy. An aluminum alloy is preferably an alloy containing an element such as magnesium, zinc or silicon. The content of transition metal, such as iron, copper, nickel, or chromium is preferably 1% or less. As a result, the long-term reliability and heat release performance in a high temperature environment can be enhanced outstandingly.

The metal container formed of aluminum or aluminum alloy is preferred to be 50 μm or less in average crystal particle size, more preferably 30 μm or less, and further preferably 5 μm or less. By defining the average crystal particle size at 50 μm or less, the strength of the metal container formed of aluminum or aluminum alloy is increased outstandingly, and the wall thickness can be further reduced. As a result, a battery of light weight, high output, and excellent long-term reliability, and being suited to be mounted on a vehicle is realized.

Figure 7:
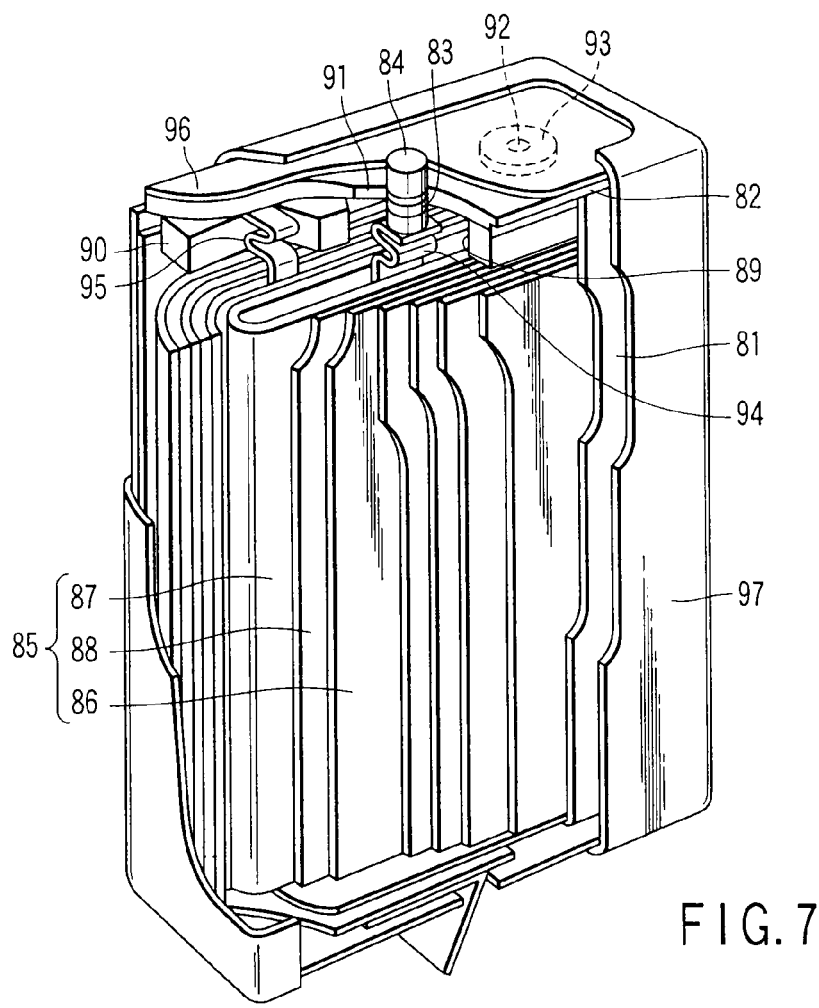
FIG. 7 is a partially cut-away perspective view of a square type nonaqueous electrolyte battery according to a first embodiment.

The nonaqueous electrolyte battery of the invention is not limited to the one using the above-described container made of a laminate film, and for example, a metal container as shown in FIG. 7 can be used.

The armoring member includes a battery container 81 made of aluminum or aluminum alloy for forming a bottomed square tubular form, a lid 82 disposed at the opening of the container 81, and a negative electrode terminal 84 attached to the lid 82 by way of an insulator 83. The container 81 serves also as a positive electrode terminal. The aluminum or aluminum alloy for composing the container 81 may be a material having the composition and average crystal particle size as mentioned above.

The electrode group 85 is housed in the battery container 81. The electrode group 85 is formed in a structure having positive electrodes 86 and negative electrodes 87 wound in a flat shape by way of interposing separators 88. The electrode group 85 is, for example, obtained by laminating the positive electrode 86, separator 88, and negative electrode 87 in this order to form a band-like structure, and coiling and winding by using a plate or cylindrical core so that the positive electrode 86 may be located at the outer side, followed by pressuring and forming the obtained coil in the radial direction.

The nonaqueous electrolyte solution (liquid nonaqueous electrolyte) is held in the electrode group 85. A spacer 90 composed of, for example, synthetic resin having a lead take-out hole 89 nearly in the center is disposed on the electrode group 85 in the container 81.

Near the center of the lid 82, a take-out hole 91 of the negative electrode terminal 84 is opened. A liquid injection port 92 is provided at a position apart from the take-out hole 91 of the lid 82. The liquid injection port 92 is sealed by a sealing plug 93 after injecting the nonaqueous electrolyte solution into the container 81. The negative electrode terminal 84 is hermetically sealed in the take-out hole 91 of the lid 82 by way of the insulator 83 made of glass or resin.

A negative electrode lead tab 94 is welded at the lower end of the negative electrode terminal 84. The negative electrode lead tab 94 is electrically connected to the negative electrode 87. One end of a positive electrode lead 95 is electrically connected to the positive electrode 86, and other end thereof is welded to the lower side of the lid 82. An insulating paper 96 covers the entire outer surface of the lid 82.

An armoring tube 97 covers the entire side surface of the container 81, and upper and lower ends are folded to the upper and lower sides of the battery main body.

The battery container is not limited to the shape of square tube, but may be formed in other shapes, such as flat shape, cylindrical shape, coin shape, button shape, sheet shape or laminate shape. In addition to a small-sized battery to be used in portable electronic appliances, it may be formed as a large-sized battery to be mounted on a two-wheel or four-wheel automobile or the like.

The negative electrode terminal can be formed of a material having electrical stability and conductivity in the range of potential to lithium ion metal from 0.4V or more to 3V or less. Specific examples are aluminum or aluminum alloy containing any element selected from Mg, Ti, Zn, Mn, Fe, Cu, and Si. Preferably, it is made of the same material as the negative electrode current collector in order to decrease the contact resistance.

The positive electrode terminal can be formed of a material having electrical stability and conductivity in the range of potential to lithium ion metal from 3V or more to 5V or less. Specific examples are aluminum or aluminum alloy containing any element selected from Mg, Ti, Zn, Mn, Fe, Cu, and Si. Preferably, it is made of the same material as the positive electrode current collector in order to decrease the contact resistance.

(Second Embodiment)

Figure 8:
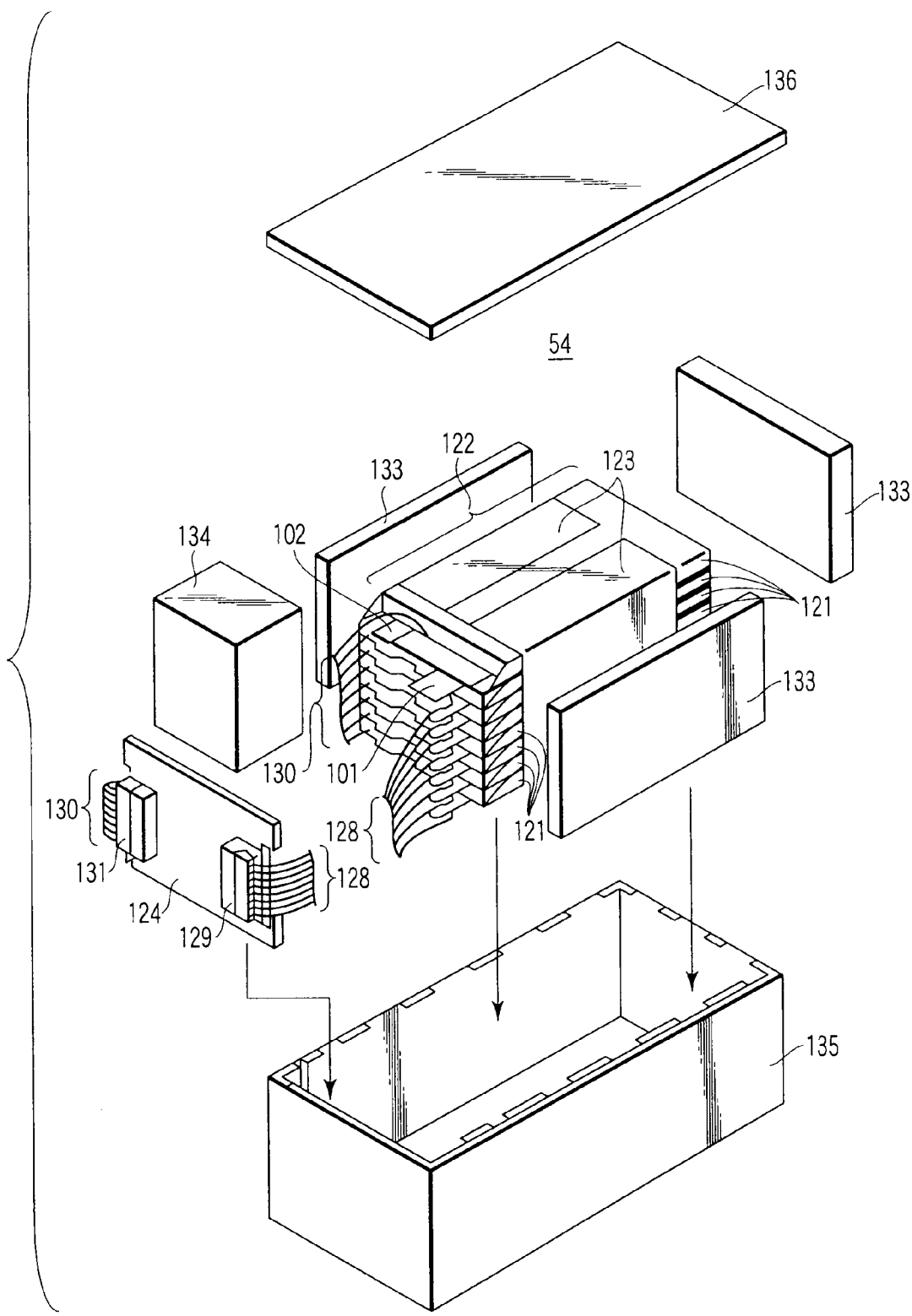
FIG. 8 is a perspective exploded view of a battery pack according to a second embodiment.

Referring now to FIG. 8, a battery pack according to a second embodiment will be explained.

The battery pack of the second embodiment has a plurality of nonaqueous electrolyte batteries of the first embodiment as single batteries. The individual single batteries are electrically arrayed in series or in parallel to form a battery module. Examples of the single batteries include batteries in the types as shown in FIG. 2, 4, or 7.

As mentioned above, the single batteries of the first embodiment are excellent in repeated charging and discharging performance, high in capacity density, and also excellent in rapid charging and discharging performance. When a battery pack is formed by using such single batteries, the entire structure is reduced in size if the design specification is the same as in the performance of a conventional product.

As shown in FIG. 8, single batteries 121 for composing a battery pack 54 are flat nonaqueous electrolyte batteries shown in FIG. 2. The plurality of single batteries 121 are laminated in the battery thickness direction, and the side surface from which a positive electrode terminal 101 and a negative electrode terminal 102 are projected is opposite to a printed wiring board 124 individually. These single batteries 121 are connected in series to compose one battery module 122. The battery module 122 is integrally bundled by an adhesive tape 123.

The printed wiring board 124 is disposed at the side surface from which the positive electrode terminal 101 and the negative electrode terminal 102 are projected. A thermistor 125, a protective circuit 126, and a terminal 127 for feeding power to an external device FIG. 9 are mounted on the printed wiring board 124.

Figure 9:
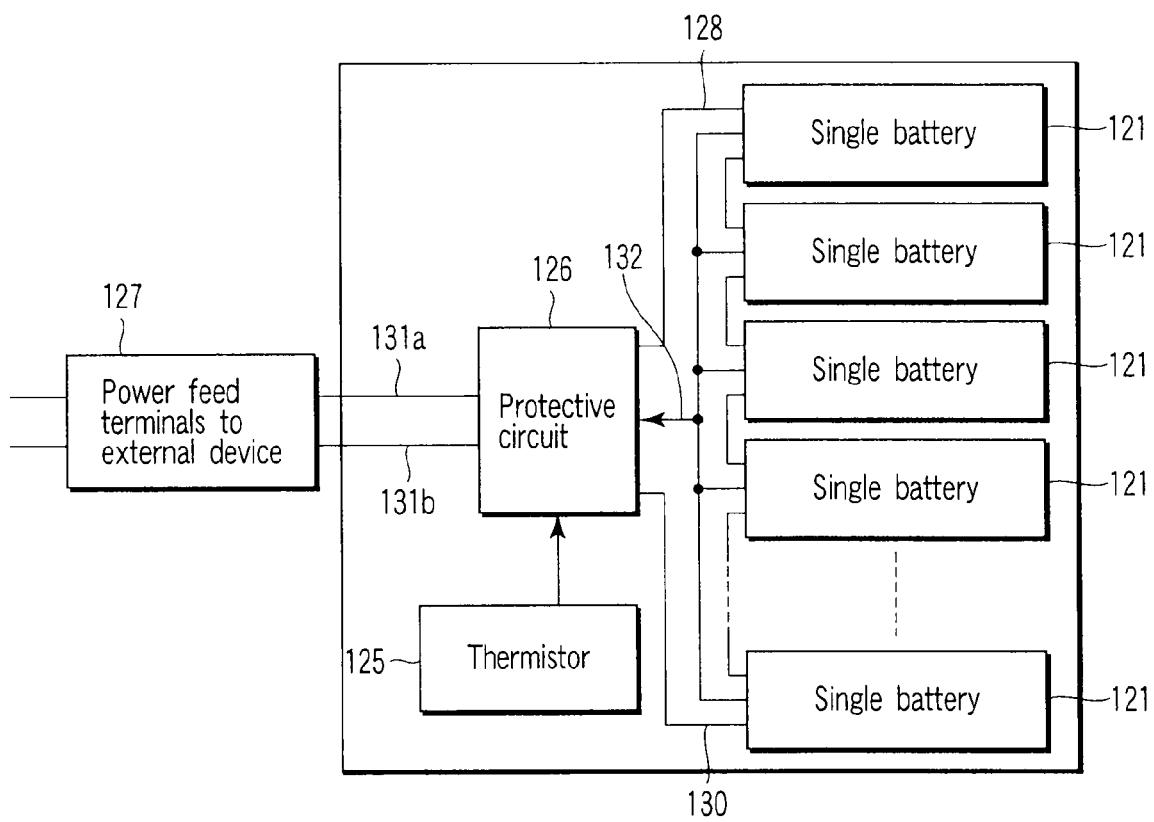
FIG. 9 is a block diagram of an electric circuit of the battery pack in FIG. 8.

As shown in FIGS. 9 and 8, a positive electrode side wiring 128 of the battery module 122 is electrically connected to a positive electrode side connector 129 of the protective circuit 126 of the printed wiring board 124. A negative electrode side wiring 130 of the battery module 122 is electrically connected to a negative electrode side connector 131 of the protective circuit 126 of the printed wiring board 124.

The thermistor 125 is for detecting the temperature of the single batteries 121, and the detected signal is sent to the protective circuit 126. The protective circuit 126 can shut off a plus side wiring 131a and a minus side wiring 131b between power feed terminals of the protective circuit and external device in a specified condition. The specified condition is, for example, when the temperature detected by the thermistor exceeds a predetermined temperature, or when overcharging, overdischarging or overcurrent of the single batteries 121 is detected. The condition is detected in the individual single batteries 121 or in the entire single batteries 121. When detecting the individual single batteries 121, the battery voltage may be detected, or the positive electrode voltage or negative electrode voltage may be detected. In the latter case, a lithium electrode is inserted in the individual single batteries 121 as a reference electrode. In the circuit shown in FIG. 9, a wiring 132 for detecting voltage is connected to each single battery 121, and the detection signal is sent to the protective circuit 26 through the wiring 132.

In the battery module 122, protective sheets 133 of rubber or resin are disposed on three side surfaces other than the side surface from which the positive electrode terminal 101 and the negative electrode terminal 102 are projected. A protective block 134 of rubber or resin is disposed between the printed wiring board 124 and the side surface from which the positive electrode terminal 101 and the negative electrode terminal 102 are projected.

This battery module 122 is housed in a pack container 135 together with the protective sheets 133, the protective block 134, and the printed wiring board 124. That is, the protective sheets 133 are disposed at both inner sides in the longer side direction and an inner side in the shorter side direction of the pack container 135, and the printed wiring board 124 is disposed at the opposite inner side of the shorter side direction. The battery module 122 is positioned in the space surrounded by the protective sheets 133 and the printed wiring board 124. A lid 136 is provided on the top of the pack container 135.

To fix the battery module 122, instead of the adhesive tape 123, a heat-shrink tube may be used. In this case, the protective sheets are placed at both sides of the battery module, the heat-shrink tube is then wound around the battery module, and the heat-shrink tube is shrunk by heat to bundle the battery module tightly.

In FIGS. 8 and 9, the single batteries 121 are connected in series, but they may be connected in parallel to increase the battery capacity. The assembled battery packs 54 may be connected either in series or in parallel.

The aspect of the battery pack may be changed properly according to the application.

The battery pack of the second embodiment is expected to be applied in large current cycle performance. Specific examples are power source of digital camera, two-wheel or four-wheel hybrid car, two-wheel or four-wheel electric vehicle, and power-assisted bicycle. In particular, a car-mount use is preferred.

When the nonaqueous electrolyte contains at least one of propylene carbonate (PC) and ethylene carbonate (EC), and γ-butyrolactone (GBL), applications of high temperature performance are desirable. Specific examples are the above-described car-mount applications.

(Third Embodiment)

Referring to FIGS. 10 to 15, a vehicle and a motorbike according to a third embodiment will be explained.

The vehicle of the third embodiment has the battery pack 54 of the second embodiment. As mentioned above, the battery pack 54 of the second embodiment is excellent in repeated charging and discharging performance, high in capacity density, and excellent in rapid charging and discharging performance, and is generally reduced in size if designed in the same specification as in the performance of a conventional product. By using such battery pack 54, the power source system of the vehicle can be reduced in size. The vehicle mentioned here includes a two-wheel or four-wheel hybrid electric vehicle, a two-wheel or four-wheel electric vehicle, and a power-assisted bicycle.

Figure 10:
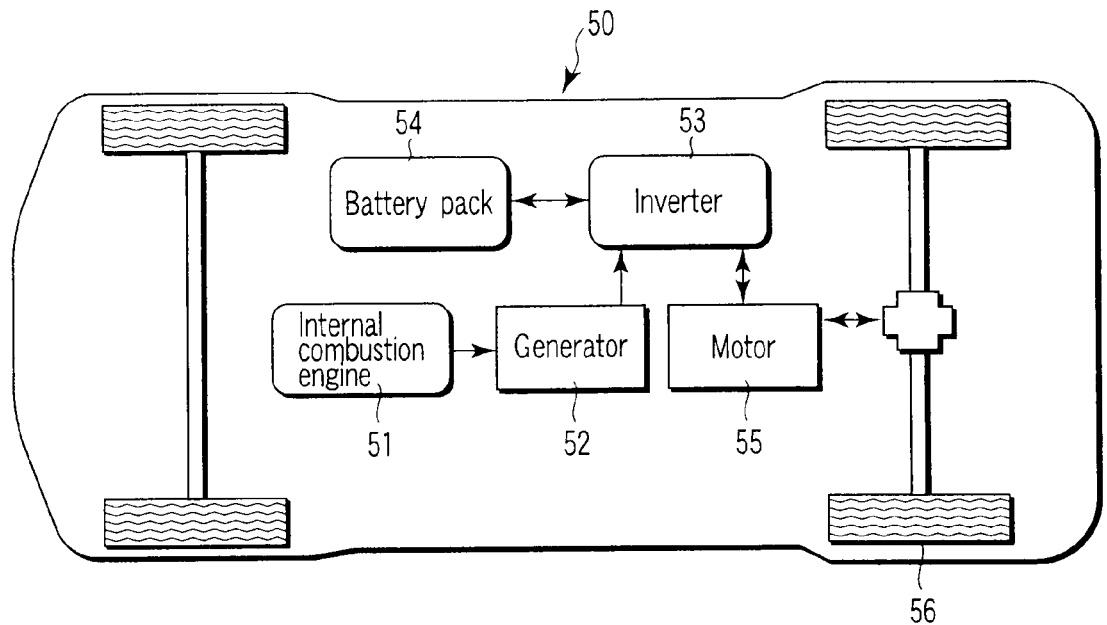
FIG. 10 is a schematic diagram of a series hybrid vehicle according to a third embodiment.
Figure 11:
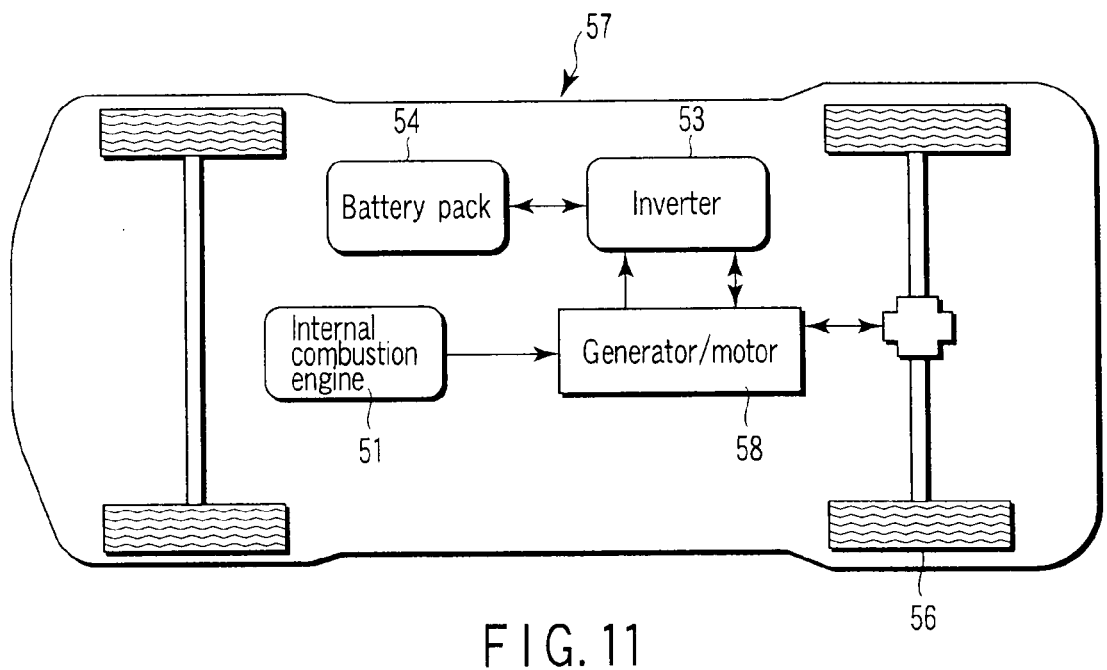
FIG. 11 is a schematic diagram of a parallel hybrid vehicle according to the third embodiment.
Figure 12:
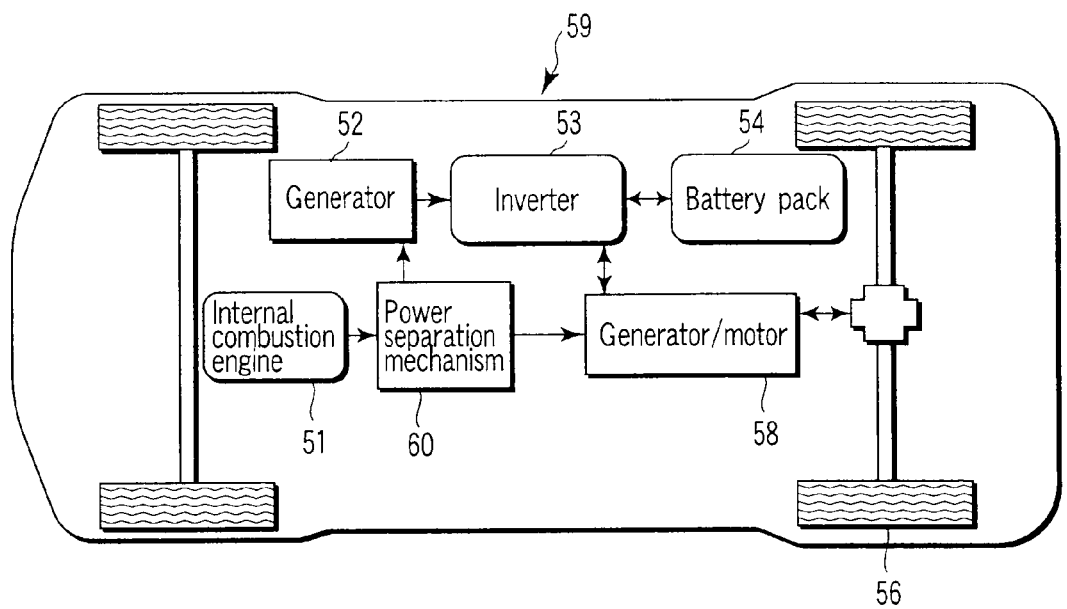
FIG. 12 is a schematic diagram of a series-parallel hybrid vehicle according to the third embodiment.

FIGS. 10 to 12 show the hybrid vehicle combining an internal combustion engine and a battery-driven motor as the driving power source. For driving a vehicle, a driving source having a wide range of rotating speed and torque is needed depending on the running condition. Generally, the internal combustion engine is limited in the torque and rotating speed showing an ideal energy efficiency, and is lowered in the energy efficiency in other operating conditions. In a hybrid type vehicle, while operating the internal combustion engine in an optimum condition to generate power, the wheels are driven by a motor of high efficiency, or the power outputs of the internal combustion engine and motor are combined, thereby improving the energy efficiency of the entire vehicle. When decelerating, the kinetic energy of the vehicle is regenerated as electric power, and the running distance per unit fuel consumption can be extended dramatically as compared with the conventional vehicle driven by the internal combustion engine alone.

Hybrid vehicles can be roughly classified into three categories depending on the combination of an internal combustion engine and an electric motor.

FIG. 10 shows a hybrid vehicle 50 generally known as series hybrid vehicle. The power of the internal combustion engine 51 is once converted totally into an electric power by a generator 52, and this electric power is stored in the battery pack 54 through an inverter 53. The battery pack 54 is the battery pack according to the second embodiment of the invention. The electric power of the battery pack 54 is supplied to a motor 55 through the inverter 53, and wheels 56 are driven by the motor 55. This is a combined system of the electric vehicle and the generator 52. The internal combustion engine 51 can be operated in a condition of high efficiency, and can regenerate the electric power. To the contrary, since the wheels 56 are driven by the motor 55 only, the motor 55 of high output is needed. The battery pack 54 is also required to be relatively large in capacity. The rated capacity of the battery pack 54 is desired to be in the range of 5 to 50 Ah. A more desirable range is 10 to 20 Ah. Herein, the rated capacity is the capacity when the battery is discharged at a rate of 0.2 C.

FIG. 11 shows a hybrid vehicle 57 generally known as parallel hybrid vehicle. Reference numeral 58 is a motor functioning also as a generator. The internal combustion engine 51 mainly drives the wheels 56, part of its power is converted as required into an electric power by the generator 58, and the battery pack 54 is charged by this electric power. The driving power is assisted by the motor 58 when the vehicle starts with a heavy load or at the time of acceleration. This system is based on an ordinary vehicle. In this system, a high efficiency is achieved by suppressing load fluctuations of the internal combustion engine 51, and the electric power is also regenerated. Since the wheels 56 are mainly driven by the internal combustion engine 51, the output of the motor 58 can be determined arbitrarily depending on the rate of the necessary assistance. The system can be built by using a relatively small motor 58 and battery pack 54. The rated capacity of the battery pack 54 is desirably in the range of 1 to 20 Ah. A more desirable range is 3 to 10 Ah.

FIG. 12 shows a hybrid vehicle 59 generally known as series-parallel hybrid vehicle. This is a combination of series type and parallel type. A power separation mechanism 60 separates the output of the internal combustion engine 51 into power generation use and wheel driving use. The engine load can be controlled more delicately than in the parallel system, and the energy efficiency can be enhanced.

The rated capacity of the battery pack is desirably in the range of 1 to 20 Ah. A more desirable range is 3 to 10 Ah.

The nominal voltage of the battery pack 54 mounted on the hybrid vehicles shown in FIGS. 10 to 12 is desirably in the range of 200 to 600V.

Figure 13:
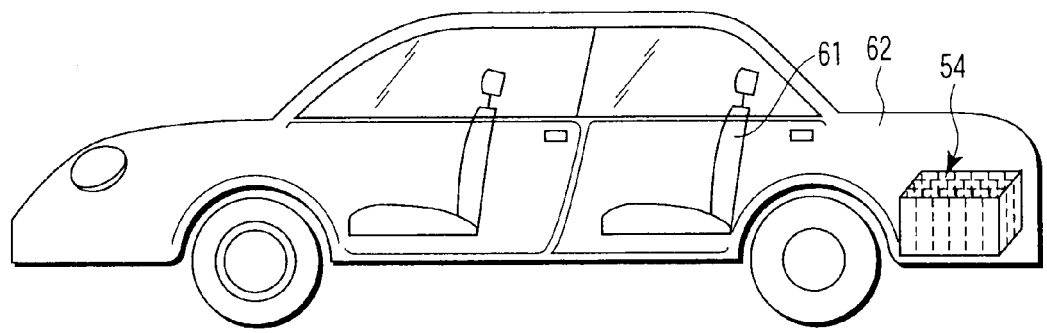
FIG. 13 is a schematic diagram of a vehicle according to the third embodiment.

The battery pack 54 is generally desired to be installed in a place which is hardly subject to changes in ambient temperature, and is not exposed to impact of collision or the like. For example, in the case of a sedan type vehicle as shown in FIG. 13, the battery pack is installed in a trunk room 62 behind rear seats 61. It can be also disposed in the lower part or rear part of the seats 61. In the case of a heavy battery, it is desired to be disposed beneath the seats or beneath the floor in order to lower the center of gravity of the entire vehicle.

An electric vehicle (EV) is driven by the energy stored in the battery pack 54 being charged by an electric power supplied from outside of the vehicle. Therefore, the electric vehicle can utilize the electric energy generated efficiently by other power generation facility. When decelerating, since the kinetic energy of the vehicle can be regenerated as electric power, the energy efficiency in running operation can be enhanced. Since the electric vehicle emits no carbon dioxide or other exhaust gas, it is a clean vehicle. On the other hand, since all driving power depends on the motor, a motor of high output is needed. Generally, since all energy necessary for one cruise must be stored in the battery pack 54 before running by one charging operation, a battery of a very large capacity is needed. The rated capacity of the battery pack 54 is desirably in the range of 100 to 500 Ah. A more desirable range is 200 to 400 Ah.

Further, since the rate of battery weight occupied in the vehicle weight is high, the battery pack 54 is preferably laid down beneath the floor or disposed at a lower position, not largely apart from the center of gravity of the vehicle. To charge a large energy consumed by one cruise in a short time, a charger and a charging cable of large capacity are necessary. Accordingly, the electric vehicle is desired to be provided with a charging connector for connecting them. The charging connector may be either an ordinary connector by electric contact, or a contactless charging connector by electromagnetic coupling.

Figure 14:
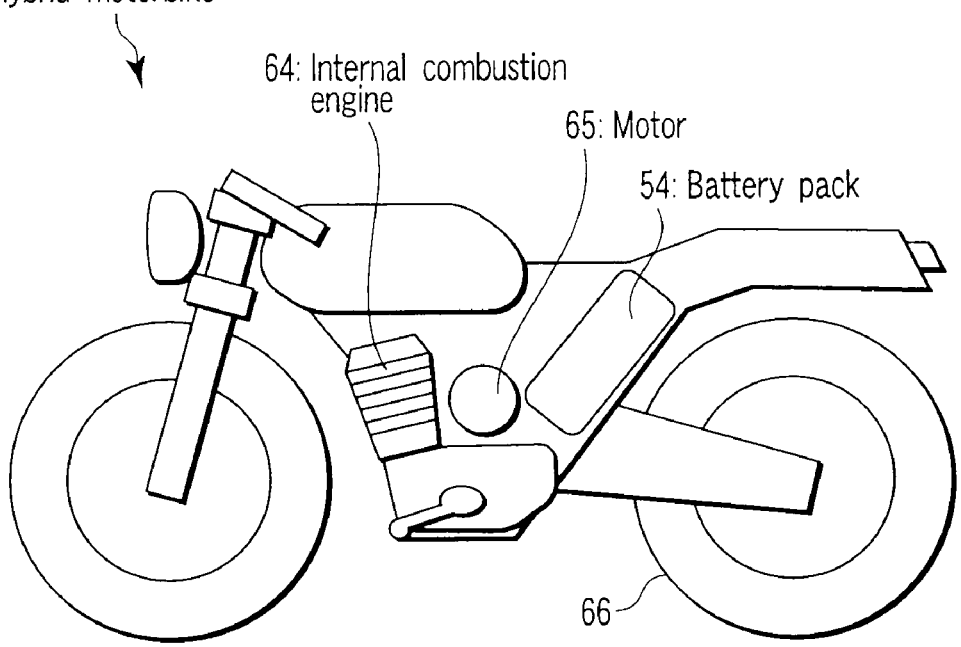
FIG. 14 is a schematic diagram of a hybrid motorbike according to the third embodiment.

FIG. 14 shows an example of a hybrid motorbike 63. In the case of a two-wheel vehicle, as in the hybrid vehicle, a hybrid motorbike of high energy efficiency can be constructed by including an internal combustion engine 64, a motor 65, and a battery pack 54. The internal combustion engine 64 mainly drives the wheel 66, and part of its power is used for charging the battery pack 54 if necessary. When the load is heavy upon start-up or acceleration, the driving force is assisted by the motor 65. Since the wheel 66 is mainly driven by the internal combustion engine 64, the output of the motor 65 can be determined arbitrarily depending on the rate of the necessary assistance. The system can be built by using a relatively small motor 65 and battery pack 54. The rated capacity of the battery pack 54 is desirably in the range of 1 to 20 Ah. A more desirable range is 3 to 10 Ah.

Figure 15:
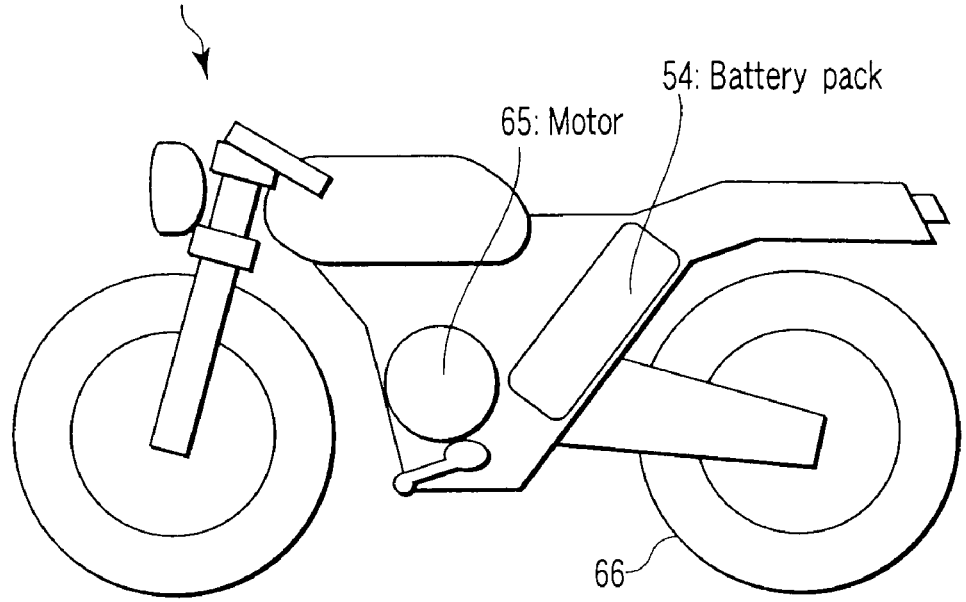
FIG. 15 is a schematic diagram of an electric motorbike according to the third embodiment.

FIG. 15 shows an example of an electric motorbike 67. The electric motorbike 67 is driven by the energy stored in the battery pack 54 being charged by an electric power supplied from outside. Since all driving power depends on the motor 65, the motor 65 needs to have high output. Generally, since all energy necessary for one cruise must be stored in the battery pack before running by one charging operation, a battery of a relatively large capacity is needed. The rated capacity of the battery pack 54 is desirably in the range of 10 to 50 Ah. A more desirable range is 15 to 30 Ah.

As mentioned above, the battery pack 54 of the second embodiment is excellent in repeated charging and discharging performance, high in capacity density, and excellent in rapid charging and discharging performance, and is generally reduced in size if designed in the same specification as in the performance of a conventional product. By using such battery pack 54, the power source system of an electric motorbike can be reduced in size.

(Fourth Embodiment)

Figure 16:
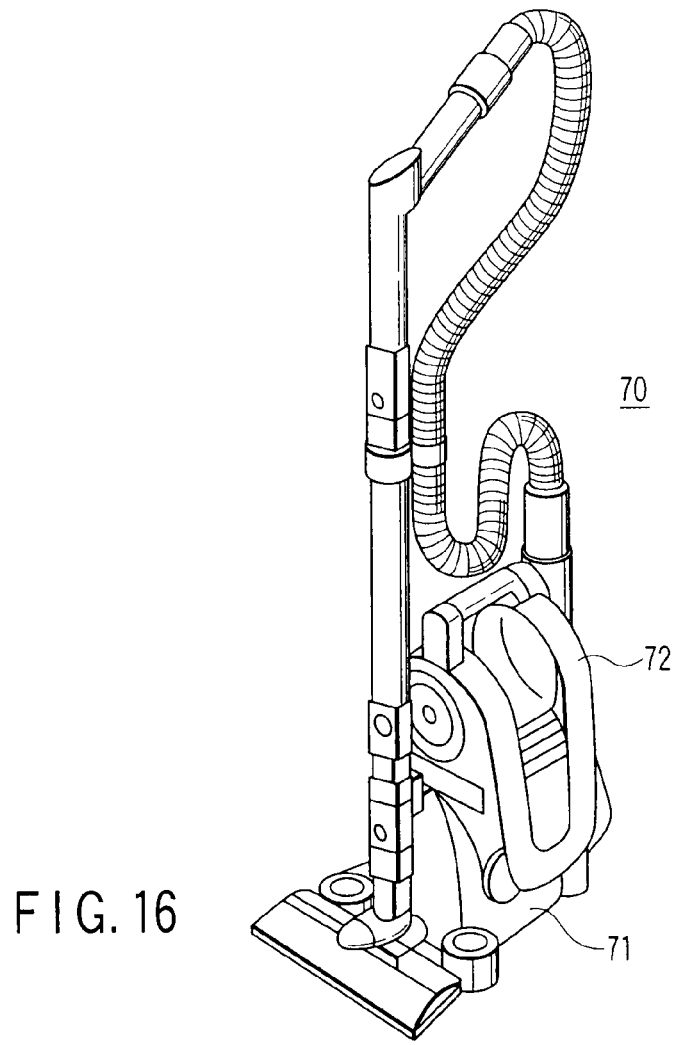
FIG. 16 is a schematic diagram of a rechargeable vacuum cleaner according to a fourth embodiment.
Figure 17:
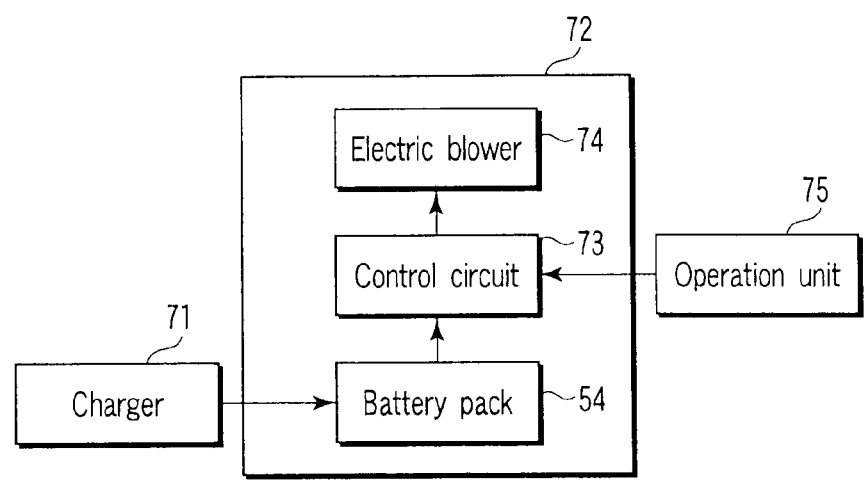
FIG. 17 is a structural diagram of the rechargeable vacuum cleaner in FIG. 16.

A rechargeable vacuum cleaner according to a fourth embodiment will be explained by referring to FIGS. 16 and 17. A rechargeable vacuum cleaner 70 includes an operation unit 75 for selecting operation modes, an electric blower 74 composed of a fan motor or the like for creating a suction force for collecting dust, and a control circuit 73. As the power source for driving these parts, the battery pack 54 of the second embodiment is housed in a casing 72 of the vacuum cleaner. When incorporating the battery pack 54 in such a portable device, it is desired to fix the battery pack 54 by using a buffer material for suppressing the effects of vibration or impact. To maintain the battery pack 54 at an appropriate temperature, a known temperature control technology can be applied. Part or whole of the charger function of a charger 71, used also as a cradle, may be housed in the casing 72.

The power consumption of the rechargeable vacuum cleaner 70 is large, but considering the portability and continuous operating time, the rated capacity of the battery pack 54 is desirably in the range of 2 to 10 Ah. A more desirable range is 2 to 4 Ah. The nominal voltage of the battery pack 54 is desirably in the range of 40 to 80V.

As mentioned above, the battery pack 54 of the second embodiment is excellent in repeated charging and discharging performance, high in capacity density, and excellent in rapid charging and discharging performance, and is generally reduced in size if designed in the same specification as in the performance of a conventional product. By using such battery pack 54, the power source system of the rechargeable vacuum cleaner 70 can be reduced in size.

EXAMPLES

The invention will be more specifically described below by showing various examples, but the invention is not limited to these examples alone. The crystal phase obtained by reaction was identified by a powder X-ray diffraction method.

In Examples 1 to 4, ramsdellite compounds whose Ti sites were displaced with Ta, Mo, W, and Nb were synthesized, and the charging and discharging behavior, and Li ion conductivity were investigated by measuring the AC impedance. In Comparative Example 1, a known ramsdellite compound $Li_2Ti_3O_7$ was used, and in Comparative Example 2, titanium oxide compounds, in which Sn having the same valency as Ti was used as a substituent element M, were synthesized to investigate the charging and discharging behavior and Li ion conductivity.

Examples 1 and 2

In Examples 1 and 2, metal-displaced lithium-titanium oxides of a ramsdellite type structure expressed by the formula (1) in which $M^V$ is Ta (example 1) or $M^V$ is Nb (example 2) were synthesized.

Materials were lithium carbonate ($Li_2CO_3$), titanium dioxide ($TiO_2$), and tantalum pentoxide ($Ta_2O_5$) or niobium pentoxide ($Nb_2O_4$), which were blended at an element ratio Li:Ti:$M^V$ of 1.9:2.9:0.1, that is, x=0.1, y=0.1, and mixed for 1 hour in a ball mill. At this time, by adding lithium carbonate about 5% more than the element ratio, the loss by baking process was compensated. In a muffle electric furnace, the materials were calcined in atmosphere, for 2 hours at 650° C., and for 12 hours at 800° C. The obtained mixed powder was mixed again in a ball mill for 1 hour, baked for 12 hours at 1100° C., and pulverized again. The obtained powder was compacted by a uniaxial pressure molding machine, and pelletized. The obtained pellets were similarly baked for 36 hours at 1100° C. To obtain a ramsdellite structure reliably, the pellets were quenched from the baking temperature to room temperature. In the quenching process, the temperature was quickly lowered to less than room temperature by using liquid nitrogen.

Figure 18:
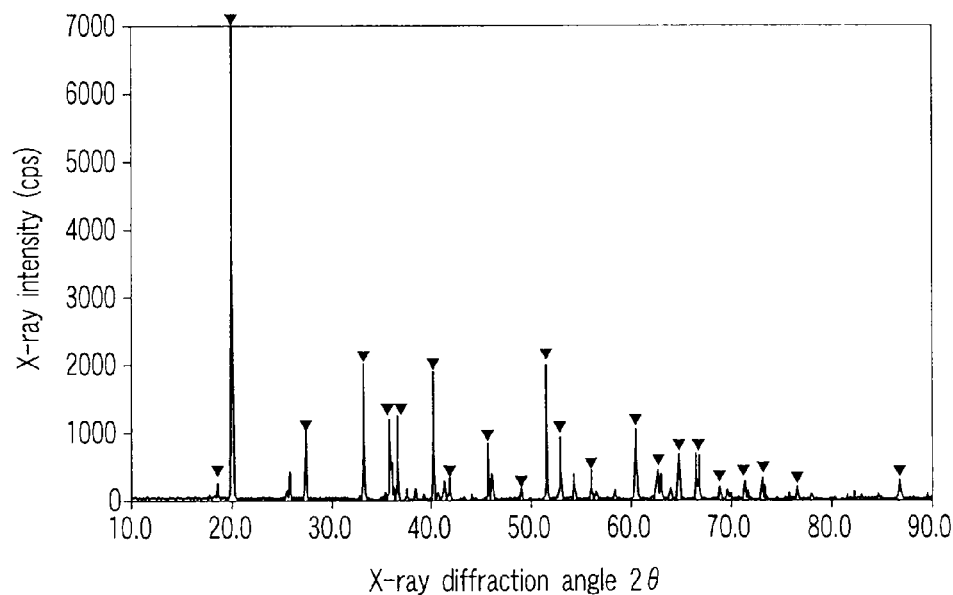
FIG. 18 is a representative X-ray diffraction diagram of a ramsdellite type compound.

FIG. 18 shows a powder X-ray diffraction pattern of obtained titanium oxide compound baked powder. In the diagram, the peak corresponding to the ramsdellite type crystal structure is indicated by an inverted triangle mark. As is clear from the diagram, almost all the peaks are derived from the ramsdellite type crystal structure, and can be exponentiated. The oxides of Examples 1 and 2 were found to show a single phase of the ramsdellite type crystal structure.

Examples 3 and 4

In Examples 3 and 4, metal-displaced lithium-titanium oxides of a ramsdellite type structure expressed by the formula (1) in which $M^{VI}$ is Mo (example 3) or $M^{VI}$ is W (example 4) were synthesized.

Materials were lithium carbonate ($Li_2CO_3$), titanium dioxide ($TiO_2$), and molybdenum trioxide ($MoO_3$) or tungsten trioxide ($WO_3$), which were blended at an element ratio Li:Ti:$M^{VI}$ of 1.8:2.9:0.1, that is, x=0.2, y=0.1, and mixed for 1 hour in a ball mill. At this time, by adding lithium carbonate about 5% more than the element ratio, the loss by baking process was compensated. In a muffle electric furnace, the materials were calcined in atmosphere, for 2 hours at 650° C., and for 12 hours at 800° C. The obtained mixed powder was mixed again in a ball mill for 1 hour, baked for 12 hours at 1100° C., and pulverized again. The obtained powder was compacted by a uniaxial pressure molding machine, and pelletized. The obtained pellets were similarly baked for 36 hours at 1100° C. To obtain a ramsdellite structure reliably, the pellets were quenched from the baking temperature to room temperature. In the quenching process, the liquid nitrogen was used as in Examples 1 and 2.

From the powder X-ray diffraction pattern of obtained metal-displaced lithium-titanium oxides of ramsdellite type, the oxides of Examples 3 and 4 were found to show a single phase of the ramsdellite type crystal structure.

Examples 5 and 6

In Examples 5 and 6, metal-displaced lithium-titanium oxides of the ramsdellite type structure expressed by the formula (1) were synthesized by varying the element ratio of Li:Ti:$M^{VI}$.

That is, in Example 5, lithium carbonate ($Li_2CO_3$), titanium dioxide ($TiO_2$), and molybdenum trioxide ($MoO_3$), or tungsten trioxide ($WO_3$) were blended at an element ratio Li:Ti:$M^{VI}$ of x=0.5, y=0.5, and mixed for 1 hour in a ball mill. In Example 6, lithium carbonate ($Li_2CO_3$), titanium dioxide ($TiO_2$), and molybdenum trioxide ($MoO_3$) or tungsten trioxide ($WO_3$) were blended at an element ratio Li:Ti:$M^{VI}$ of x=1.0, y=1.0, and mixed for 1 hour in a ball mill. At this time, by adding lithium carbonate about 5% more than the element ratio, the loss by baking process was compensated. In a muffle electric furnace, the materials were calcined in atmosphere, for 2 hours at 650° C., and for 12 hours at 800° C. The obtained mixed powder was mixed again in a ball mill for 1 hour, baked for 12 hours at 1100° C., and pulverized again. The obtained powder was compacted by a uniaxial pressure molding machine, and pelletized. The obtained pellets were similarly baked for 36 hours at 1100° C. To obtain a ramsdellite structure reliably, the pellets were quenched from the baking temperature to room temperature. In the quenching process, the liquid nitrogen was used as in Examples 1 and 2.

From the powder X-ray diffraction pattern of the obtained metal-displaced lithium-titanium oxides of ramsdellite type, the oxide of Example 5 was found to show a single phase of the ramsdellite type crystal structure. On the other hand, the oxide of Example 6 was found to contain an impurity phase in addition to the ramsdellite phase.

Comparative Example 1

In Comparative Example 1, known metal-nondisplaced lithium-titanium oxide compound of the ramsdellite type structure expressed by the formula $Li_{16/7}Ti_{24/7}O_8$ (that is, $Li_2Ti_3O_7$) was synthesized.

That is, lithium carbonate ($Li_2CO_3$) and titanium dioxide ($TiO_2$) were blended at an element ratio Li:Ti of 2:3, and mixed for 1 hour in a ball mill. At this time, by adding lithium carbonate about 5% more than the element ratio, the loss by baking process was compensated. In a muffle electric furnace, the materials were calcined in atmosphere, for 2 hours at 650° C., and for 12 hours at 800° C. The obtained mixed powder was mixed again in a ball mill for 1 hour, baked for 12 hours at 1100° C., and pulverized again. The obtained powder was compacted by a uniaxial pressure molding machine, and pelletized. The obtained pellets were similarly baked for 36 hours at 1100° C. To obtain a ramsdellite structure reliably, the pellets were quenched from the baking temperature to room temperature.

From the powder X-ray diffraction pattern of the obtained titanium oxide compound of ramsdellite type, the oxide of Comparative Example 1 was found to show a single phase of the known ramsdellite type crystal structure.

Comparative Example 2

In Comparative Example 2, tin-displaced lithium-titanium oxide of ramsdellite type structure expressed by the formula $Li_{16/7}Ti_{(24/7)-y}Sn_yO_8$ was synthesized.

That is, lithium carbonate ($Li_2CO_3$), titanium dioxide ($TiO_2$), and tin dioxide ($SfO_2$) were blended at an element ratio Li:Ti:Sn of 2:2.9:0.1, that is, y=0.1, and mixed for 1 hour in a ball mill. At this time, by adding lithium carbonate about 5% more than the element ratio, the loss by baking process was compensated. In a muffle electric furnace, the materials were calcined in atmosphere, for 2 hours at 650° C., and for 12 hours at 800° C. The obtained mixed powder was mixed again in a ball mill for 1 hour, baked for 12 hours at 1100° C., and pulverized again. The obtained powder was compacted by a uniaxial pressure molding machine, and pelletized. The obtained pellets were similarly baked for 36 hours at 1100° C. To obtain a ramsdellite structure reliably, the pellets were quenched from the baking temperature to room temperature.

From the powder X-ray diffraction pattern of the obtained titanium oxide compound of ramsdellite type, the oxide of Comparative Example 2 was found to show a single phase of the ramsdellite type crystal structure.

<Measurement of Lithium Ion Conductivity>

Diffusion performance of lithium is almost entirely dominated by lithium ion conductivity except for thermal diffusion. To measure the lithium ion conductivity of the ramsdellite type oxides synthesized in Examples 1 to 6 and Comparative Examples 1 and 2, the oxides were baked into pellets, metal electrodes were sputtered on both sides of the obtained pellet samples, and alternating-current impedance was measured by an ion blocking method. It was measured in the condition of applied voltage of 10 mV, frequency range of 5 Hz to 13 MHz, and temperature of 25° C. By fitting by using an equivalent circuit from the obtained Nyquist diagram, the lithium ion conductivity of a bulk portion was investigated.

Table 1 shows the results of ratio of lithium ion conductivity in Examples 1 to 6 and Comparative Example 2 on the basis of a reference value of 1.00 of known ramsdellite type oxide $Li_2Ti_3O_7$ (Comparative Example 1). As is known from the results, the oxides of Examples 1, 2, 3 and 4 were higher in lithium ion conductivity than the oxide of Comparative Example 1. The oxides of Examples 5 and 6 were higher in lithium ion conductivity than the oxide of Comparative Example 1. However, the oxide of Example 6 was reduced in lithium ion quantity, and was lower in lithium ion conductivity than the oxide of Example 5. The oxide of Comparative Example 2 was much lower in lithium ion conductivity than the oxide of Comparative Example 1.

These results suggested that the oxides of Examples 1 to 6 had a high lithium ion conductivity, and are excellent in lithium ion diffusion in the solid matter. This is considered to be the effect of displacing part of Ti with M of higher valency, thereby generating hole sites and decreasing the bonding strength of Li—O.

TABLE 1

| | Ratio of Li ion conductivity in bulk |
|---|---|
| Example 1 | 1.51 |
| Example 2 | 1.45 |
| Example 3 | 1.26 |
| Example 4 | 1.15 |
| Example 5 | 1.20 |
| Example 6 | 1.05 |
| Comparative Example 1 | 1.00 |
| Comparative Example 2 | 0.90 |

<Fabrication of Electrochemical Measuring Cell (Half-cell)>

In the powder of the synthesized oxide, polytetrafluoroethylene was mixed by 10 wt % as binder, and acetylene black by 30 wt % as conductive agent, and mixed in a solvent to obtain a dispersed matter. The dispersed matter was applied on one principal plane of an aluminum base material, and dried, pressurized and formed, and an operating electrode was fabricated. To evaluate electrochemical intercalation and deintercalation of lithium ions, a metal lithium foil was used as a counter-electrode of the operating electrode to fabricate and a half-cell (electrochemical measuring cell), which was used in the following evaluation.

In this measuring cell, since the lithium metal is used as counter-electrode, the electrode potential of the operating electrode is noble as compared with the counter-electrode. Accordingly, the polarity is inverted compared to the case where the operating electrode is used as the negative electrode of the whole cell. To avoid this confusion, in the measuring cell (half-cell), the direction of intercalating the lithium ion into the operating electrode is called "charging," and the direction of deintercalating is called "discharging." The non-aqueous electrolyte solution was prepared by dissolving lithium hexafluorophosphate in propylene carbonate solvent at a concentration of 1M.

<Evaluation of Charging and Discharging Characteristic>

Using this electrochemical measuring cell, the battery was charged and discharged in a potential range of 0.5V to 2.5V by reference to a metal lithium electrode. In a thermostatic oven kept at room temperature of 25° C., the battery was charged and discharged at an equivalent of 0.2 C. Herein, 1 C is the current value required to discharge a single cell completely in 1 hour, and for the sake of convenience, the numerical value of nominal capacity of a single cell may be called 1 C current value. Therefore, 0.2 C is the current value required to discharge the nominal capacity in 5 hours.

Figure 19:
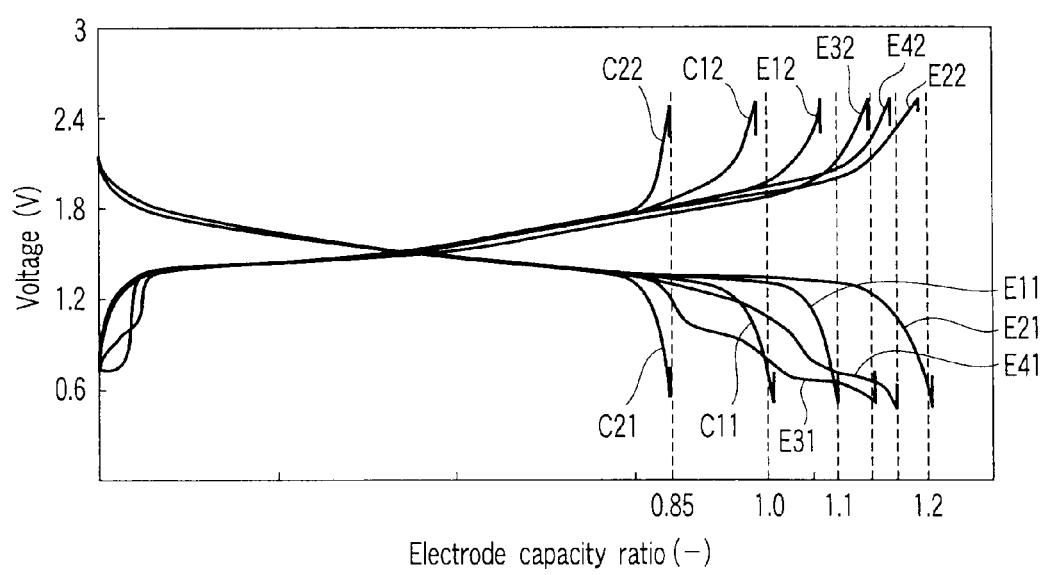
FIG. 19 is a characteristic diagram of charging and discharging characteristics of a battery using the negative electrode active materials of examples and Comparative Examples.

FIG. 19 shows characteristic diagrams of charging curves E11, E21, E31, E41, C11, C21, and discharging curves E12, E22, E32, E42, C12, C22 of Examples 1 to 6 and Comparative Examples 1 and 2. These charging and discharging curves were obtained in the following process. Operating electrodes were fabricated by using the oxides of Examples 1 to 6 and Comparative Examples 1 and 2, and the obtained operating electrodes were assembled in electrochemical measuring cells. These electrochemical measuring cells were charged in the specified condition to obtain and charging curves, and the electrochemical measuring cells were discharged in the specified condition to obtain discharging curves.

From these charging and discharging curves E11 to E41, E12 to E42, the operating electrodes of Examples 1 to 6 were confirmed to have an average operating voltage of about 1.5V equivalent to voltage derived from titanium oxidation and reduction, and a flat potential was recognized.

From the charging curves E31 and E41, in Example 3 (M=Mo) and Example 4 (M=W) containing hexavalent metal oxide, a small flat potential of second stage corresponding to reduction of displacing element (decrease of valency) was recognized in the terminal stage of charging. That is, when lithium ion (monovalent) gets into a three-dimensional skeleton of a crystal, in order to maintain the electrical neutrality of the entire crystal, not only is the titanium ion (tetravalent) reduced, but also the displacing element M is changed from hexavalent to pentavalent form, which is estimated to express a small flat potential of the second stage.

In discharge capacity of the operating electrodes using the oxides of Examples 1 to 6 and Comparative Examples 1 and 2, the electrode weight capacity density (mAh/g) was calculated, and on the basis of reference value (1.00) of Comparative Example 1, the discharge capacity ratio of Examples 1 to 6 and Comparative Example 2 is shown in Table 2. According to the result, Example 1 was increased in discharge capacity by 8% as compared with Comparative Example 1, and Example 2 was increased in discharge capacity by as much as 21% as compared with Comparative Example 1. This is considered to be the result of increasing effect of hole quantity at tunnel site by displacement of element M of higher valency (pentavalent or hexavalent) into Ti site.

In discharge capacity of Examples 5 and 6, similarly, the electrode weight capacity density (mAh/g) was calculated, and on the basis of reference value (1.00) of Comparative Example 1, the discharge capacity ratio was calculated and the results are in Table 2. The electrode weight capacity density (mAh/g) mentioned herein is discharge capacity per unit weight of the electrode. The discharge capacity ratio is the ratio of the measured discharge capacity to the reference value of discharge capacity. In Example 6 (x=y=1.0), since the electrode weight capacity density is decreased due to presence of impurity phase, the discharge capacity ratio is lower (0.65) than that in Comparative Example 1. This is because the impurity phase does not contribute to charge and discharge. By evaluating comprehensively these results and the results of lithium ion conductivity, each range of x and y is desired to be 0.5 or less.

TABLE 2

| | Discharge capacity ratio |
|---|---|
| Example 1 | 1.08 |
| Example 2 | 1.21 |
| Example 3 | 1.12 |
| Example 4 | 1.17 |
| Example 5 | 1.02 |
| Example 6 | 0.65 |
| Comparative Example 1 | 1.00 |
| Comparative Example 2 | 0.85 |

<Evaluation of Discharge Rate Characteristics>

In the operating electrodes manufactured the oxides of Examples 1 to 4 and Comparative Examples 1 and 2, the current value was raised at elevating steps, and the rate characteristics were tested. With reference to metal lithium electrode, the batteries were charged and discharged in the potential range of 0.5V to 2.5V. By varying the discharge rate to 0.2 C, 0.5 C, and 1 C, measuring cells of Examples 1 to 4 and Comparative Examples 1 and 2 were discharged, and the discharge capacity was measured. The results are shown in Table 3. The discharge capacity ratio when discharged at a rate of 0.2 C is indicated as reference value 1.0. In Examples 1, 2, 3, and 4, the discharge capacity was maintained higher than in Comparative Example 1. Hence, the oxide compounds of the invention are also confirmed to be suited to fast charging and discharging. On the other hand, the discharge capacity ratio of Comparative Example 2 was lowest in all the Examples and Comparative Examples.

TABLE 3

| Discharge rate | 0.2 c | 0.5 c | 1.0 c |
|---|---|---|---|
| | Discharge capacity ratio | | |
| Example 1 | 1.0 | 0.93 | 0.89 |
| Example 2 | 1.0 | 0.95 | 0.86 |

TABLE 3-continued

| Discharge rate | 0.2 c | 0.5 c | 1.0 c |
|---|---|---|---|
| | Discharge capacity ratio | | |
| Example 3 | 1.0 | 0.85 | 0.80 |
| Example 4 | 1.0 | 0.83 | 0.78 |
| Comparative Example 1 | 1.0 | 0.81 | 0.71 |
| Comparative Example 2 | 1.0 | 0.65 | 0.45 |

The invention hence provides a negative electrode active material and a nonaqueous electrolyte battery excellent in fast charging and discharging performance and repeated charging and discharging performance, and further provides a small-sized battery pack having batteries of such excellent performances, and a small-sized vehicle having such battery pack.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A negative electrode active material comprising a metal-displaced lithium-titanium oxide expressed by the formula (1):

$$Li_{(16/7)-x}Ti_{(24/7)-y}M_yO_8 \quad (1)$$

where M is at least one metal element selected from the group consisting of Nb, Ta, Mo, and W, and x and y are respectively numbers in the range of 0<x<16/7 and 0<y<24/7.

2. The material according to claim 1, wherein the x and y are in the range of 0<x≦2.0, and 0<y≦2.0, respectively.

3. The material according to claim 2, wherein the x and y are in the range of 0<x≦0.5, and 0<y≦0.5, respectively.

4. A nonaqueous electrolyte battery comprising:
   a negative electrode comprising a negative electrode active material;
   a positive electrode;
   a nonaqueous electrolyte; and
   a battery container which accommodates the negative electrode, the positive electrode, and the nonaqueous electrolyte,
   wherein the negative electrode active material comprises a metal-displaced lithium-titanium oxide expressed by the formula (1):

$$Li_{(16/7)-x}Ti_{(24/7)-y}M_yO_8 \quad (1)$$

where M is at least one metal element selected from the group consisting of Nb, Ta, Mo, and W, and x and y are respectively numbers in the range of 0<x<16/7 and 0<y<24/7.

5. The battery according to claim 4, wherein the x and y are in the range of 0<x≦2.0, and 0<y≦2.0, respectively.

6. The battery according to claim 5, wherein the x and y are in the range of 0<x≦0.5, and 0<y≦0.5, respectively.

7. The battery according to claim 4, wherein the negative electrode active material has an average particle size of 1 μm or less.

8. A battery pack comprising the nonaqueous electrolyte battery according to claim 4.

9. A vehicle comprising the nonaqueous electrolyte battery according to claim 4.

* * * * *